United States Patent
Taherzadeh Boroujeni et al.

(10) Patent No.: US 12,388,605 B2
(45) Date of Patent: Aug. 12, 2025

(54) WAVEFORM INDICATION FOR PUCCH

(71) Applicant: QUALCOMM Incorporated, San Diego, CA (US)

(72) Inventors: Mahmoud Taherzadeh Boroujeni, San Diego, CA (US); Gokul Sridharan, Sunnyvale, CA (US); Tao Luo, San Diego, CA (US); Peter Gaal, San Diego, CA (US); Xiaoxia Zhang, San Diego, CA (US); Jing Sun, San Diego, CA (US); Jelena Damnjanovic, Del Mar, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 17/894,969

(22) Filed: Aug. 24, 2022

(65) Prior Publication Data
US 2024/0072972 A1 Feb. 29, 2024

(51) Int. Cl.
*H04L 27/26* (2006.01)
*H04L 5/00* (2006.01)
*H04W 72/23* (2023.01)

(52) U.S. Cl.
CPC .......... *H04L 5/0053* (2013.01); *H04W 72/23* (2023.01)

(58) Field of Classification Search
CPC ..... H04L 5/0053; H04L 5/0094; H04W 72/23
See application file for complete search history.

(56) References Cited

U.S. PATENT DOCUMENTS

| | | | | |
|---|---|---|---|---|
| 2010/0067591 A1* | 3/2010 | Luo | ............... | H04L 5/0051 375/295 |
| 2019/0037561 A1* | 1/2019 | Jung | ............... | H04L 1/1812 |
| 2019/0098580 A1* | 3/2019 | Babaei | ............... | H04W 72/56 |
| 2019/0124645 A1* | 4/2019 | Huang | ............... | H04W 72/21 |
| 2020/0053722 A1* | 2/2020 | Choi | ............... | H04W 72/21 |
| 2021/0160149 A1* | 5/2021 | Ma | ............... | H04W 72/20 |
| 2024/0236985 A1* | 7/2024 | Lei | ............... | H04L 1/1812 |

FOREIGN PATENT DOCUMENTS

WO   WO-2024002471 A1 *  1/2024 .......... H04L 5/0007

OTHER PUBLICATIONS

3GPP TSG RAN WG1#85, R1-164741 Title:PUSCH scheduling for LAA (Year: 2016).*
3GPP TSG RAN WG1#85, R1-164741 Title:PUSCH scheduling for LAAA (Year: 2016).*
3GPP TSG RAN Meeting#84bis, R1-162177 Title:Waveform and Multiple Access for 5G New Radio Internat (Year: 2016).*
(Continued)

*Primary Examiner* — Christopher M Crutchfield
*Assistant Examiner* — Abusayeed M Haque
(74) *Attorney, Agent, or Firm* — Loza & Loza, LLP

(57) ABSTRACT

Aspects of the disclosure provide techniques for waveform indication for physical uplink control channel (PUCCH) transmissions. A network entity may provide an indication of a waveform type, such as CP-OFDM, DFT-s-OFDM, or other suitable waveform type, for a PUCCH format to a user equipment (UE). The UE may then communicate a PUCCH with the network entity using the waveform type for the PUCCH format.

29 Claims, 16 Drawing Sheets

(56) References Cited

OTHER PUBLICATIONS

3GPP TSG RAN WG1 Meeting#85, R1-165200 Title:UE-Specific aperiodic CSI-RS with Semi-static resource Reservation (Year: 2016).*
International Search Report and Written Opinion—PCT/US2023/072657—ISA/EPO—Jan. 3, 2024.
Moderator (NTT Docomo Inc): "Summary on Rel-17 NR TEI Related Discussion", 3GPP TSG RAN WG1 #106-e, R1-2107889, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, 90 Pages, Aug. 27, 2021, XP052042728, p. 75, Section "TEI proposal #14", Section 2.3, p. 77, table row "OPPO", p. 77, Section 2.13.
Qualcomm Incorporated: "Potential Coverage Enhancement Techniques for Pusch", R1-2008626, 3GPP TSG-RAN WG1 Meeting #103e, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 17, 2020, XP051940252, 14 Pages, Section 4, p. 9-p. 11, Figures 12-13, The Whole Document.

* cited by examiner

| PUCCH Format | Length in #OFDM Symbols | #UCI Bits | Waveform | Description |
|---|---|---|---|---|
| 0 | 1 - 2 | ≤ 2 | CGS seq | Short PUCCH Format with 1-2 bits UCI |
| 1 | 4 - 14 | ≤ 2 | CGS seq | Long PUCCH Format with 1-2 bits UCI (TD-OCC) |
| 2 | 1 - 2 | > 2 | CP-OFDM | Short PUCCH Format with >2 bits UCI |
| 3 | 4 - 14 | > 2 | DFT-s-OFDM | Long PUCCH Format with >2 bits UCI and no multiplexing capability |
| 4 | 4 - 14 | > 2 | DFT-s-OFDM | Long PUCCH Format with >2 bits UCI and multiplexing capability |

FIG. 7

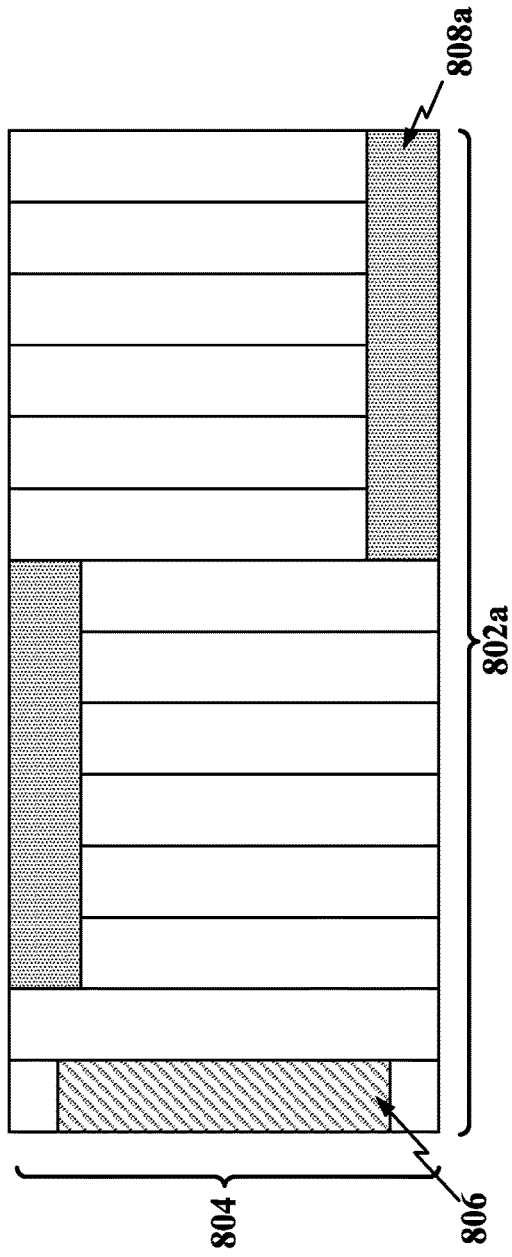
FIG. 8A
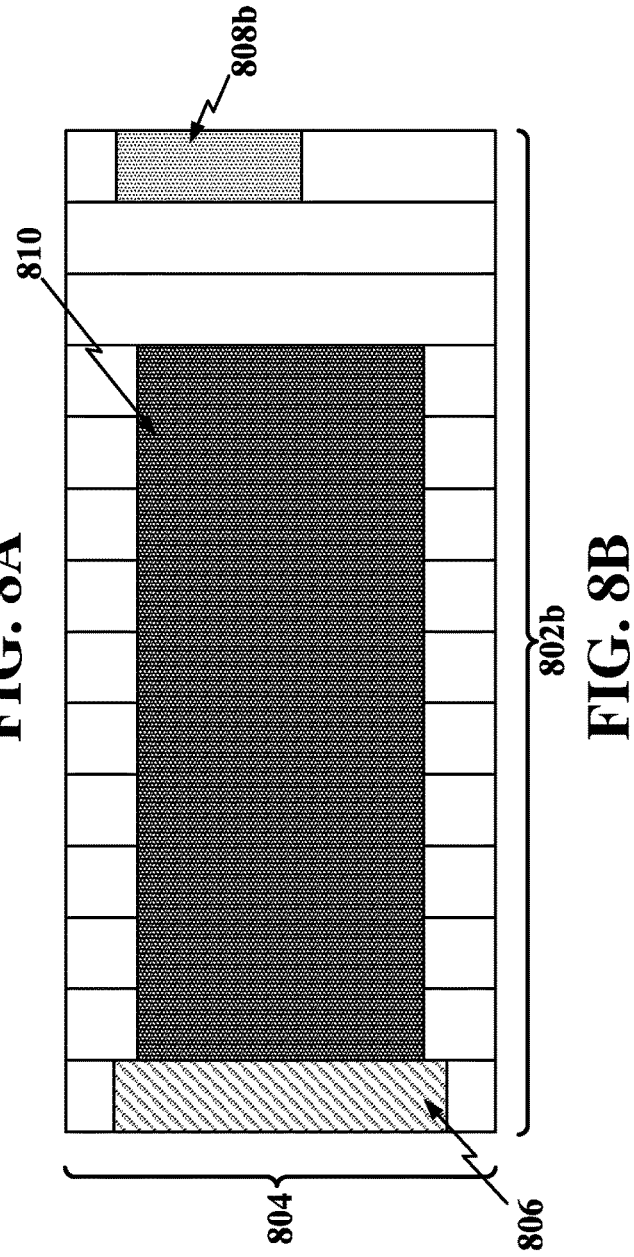
FIG. 8B

WAVEFORM INDICATION FOR PUCCH

TECHNICAL FIELD

The technology discussed below relates generally to wireless communication systems, and more particularly, to indicating a waveform to be used for transmission of a physical uplink control channel (PUCCH).

INTRODUCTION

In wireless communication systems, such as those specified under standards for 5G New Radio (NR), a user equipment (UE) may be capable of communicating with a network entity over an air interface. Transmissions over the air interface from the network entity to the UE may be referred to as downlink (DL) transmissions, whereas transmissions over the air interface from the UE to the network entity may be referred to as uplink (UL) transmissions. In a DL transmission, the network entity may transmit DL control information (DCI) including one or more DL control channels, such as a physical downlink control channel (PDCCH), to the UE. In addition, the network entity may transmit DL data traffic on one or more DL traffic channels, such as a physical downlink shared channel (PDSCH), to the UE. In an UL transmission, the UE may transmit UL control information (UCI) including one or more UL control channels, such as a physical uplink control channel (PUCCH), to the network entity. In addition, the UE may transmit UL data traffic on one or more UL traffic channels, such as a physical uplink shared channel (PUSCH), to the network entity.

The UL and/or DL control information and UL and/or DL data traffic may be transmitted on a waveform. For example, DL transmissions may utilize a cyclic prefix orthogonal frequency division multiplexing (CP-OFDM) waveform, while UL transmissions may utilize a CP-OFDM waveform or a discrete Fourier transform-spread-OFDM (DFT-s-OFDM) waveform.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a network entity is disclosed. The network entity includes a memory and a processor coupled to the memory. The processor is configured to provide an indication of a waveform type for a first format of a physical uplink control channel (PUCCH) and communicate the PUCCH using the waveform type for the first format.

Another example provides a method for wireless communication at a network entity. The method includes providing an indication of a waveform type for a first format of a physical uplink control channel (PUCCH) and communicating the PUCCH using the waveform type for the first format.

Another example provides a user equipment (UE) including a memory and a processor coupled to the memory. The processor is configured to receive an indication of a waveform type for a first format of a physical uplink control channel (PUCCH) and communicate the PUCCH using the waveform type for the first format.

Another example provides a method for wireless communication at a user equipment (UE). The method includes receiving an indication of a waveform type for a first format of a physical uplink control channel (PUCCH) and communicating the PUCCH using the waveform type for the first format.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIG. 7 is a diagram illustrating an example of physical uplink control channel (PUCCH) formats according to some aspects.

FIGS. 8A and 8B are diagrams illustrating examples of long PUCCH and short PUCCH according to some aspects.

DETAILED DESCRIPTION

Figure 1:
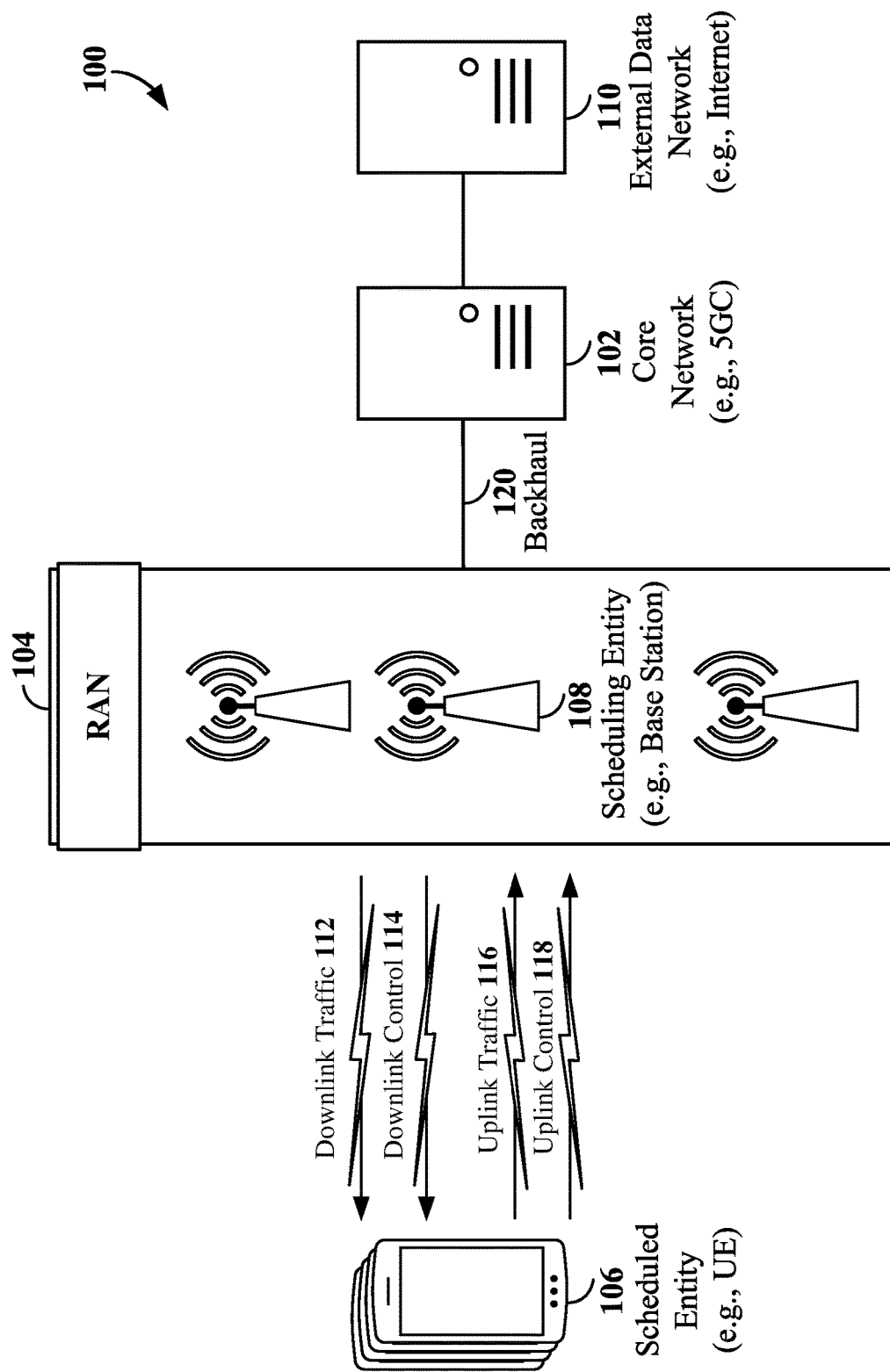
FIG. 1 is a diagram illustrating an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF) chains (RF-chains), power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

5G NR provides several different types of waveforms for downlink and uplink communication. For example, DL transmissions may utilize a cyclic prefix orthogonal frequency division multiplexing (CP-OFDM) waveform, while UL transmissions may utilize a CP-OFDM waveform or a discrete Fourier transform-spread-OFDM (DFT-s-OFDM) waveform. In an example of uplink communication, a physical uplink control channel (PUCCH) may be used to transmit uplink control information from a UE to a network entity (e.g., an aggregated or disaggregated base station). There are five PUCCH formats defined for 5G NR, each of which utilizes a respective waveform. For example, PUCCH format 2 utilizes CP-OFDM, whereas PUCCH formats 3 and 4 utilize DFT-s-OFDM. Here, PUCCH format 2 is a short PUCCH format using one or two symbols, while PUCCH formats 3 and 4 are long PUCCH formats using four to fourteen symbols. In addition, each of PUCCH formats 2, 3, and 4 include more than two bits.

In current 5G NR specifications, the waveform associated with a particular PUCCH format may not change, even by semi-static configuration. However, there may be scenarios in which a different waveform may be beneficial for a particular PUCCH format. For example, the peak-to-average power ratio (PAPR) is a measure of how efficiently a power amplifier operates when transmitting a signal. For a UE, a low PAPR indicates that the power amplifier efficiency is high, thus saving battery in the UE. The PAPR in OFDM signals is high due to the linear combination of symbols. However, the PAPR in DFT-s-OFDM signals is low since the symbols are first distributed (spread) with a discrete cosine transform block. Therefore, in examples in which the network coverage is limited, in order to save power, a DFT-s-OFDM waveform may be preferred for a particular PUCCH format (e.g., PUCCH format 2).

Various aspects of the disclosure relate to waveform indication for PUCCH. A network entity (e.g., an aggregated or disaggregated base station) may provide an indication of a waveform type (e.g., CP-OFDM, DFT-s-OFDM, or other suitable waveform type) for a PUCCH format. In some examples, the PUCCH format may be PUCCH format 2, and the network entity may indicate whether CP-OFDM or DFT-s-OFDM should be used to transmit a PUCCH with PUCCH format 2. In other examples, another short PUCCH format may be defined for more than two bits with a DFT-s-OFDM waveform and the network entity may indicate whether the PUCCH format 2 (with CP-OFDM) or the other short PUCCH format (with DFT-s-OFDM) should be used to transmit the PUCCH. In some examples, the indication of the waveform type may indicate a pulse shape and/or filter for the waveform. In this example, the waveform type may stay the same for the PUCCH format (e.g., CP-OFDM for PUCCH format 2), but the pulse shape and/or filter may change.

In some examples, the network entity may semi-statically configure the waveform for the PUCCH format via, for example, radio resource control (RRC) signaling. In other examples, the network entity may dynamically configure the waveform for the PUCCH format. For example, the network entity may configure the waveform for the PUCCH format as part of a PUCCH resource configuration. The PUCCH resource configuration may indicate, for example, a respective waveform for each PUCCH resource. The network entity may then dynamically indicate the PUCCH resource within, for example, downlink control information (DCI). For example, the DCI may include a PUCCH resource indicator (PRI) that indicates a specific PUCCH resource for a PUCCH. The PUCCH resource, based on the PUCCH resource configuration, is associated with a particular waveform, and therefore, the PRI may dynamically indicate the waveform for the PUCCH. In some examples, the PRI in combination with an index of a first control channel element (CCE) carrying the DCI containing the PRI may be used to determine the waveform. Dynamic indication of the waveform via DCI may be used, for example, for a PUCCH that carries hybrid automatic repeat request (HARQ) feedback information for a dynamically scheduled physical downlink shared channel (PDSCH) or for a semi-persistently scheduled PDSCH (e.g., based on an activating DCI for the SPS configuration).

In some examples, changing the waveform for a PUCCH format may result in changing the number of symbols for the PUCCH. For example, the PUCCH resource configuration may configure a respective number of symbols for each PUCCH resource, and the dynamic indication of a waveform via PRI may result in a number of PUCCH symbols that is different than a predefined number of symbols (e.g., predefined by 5G NR standards and/or specifications) for a particular PUCCH format. In some examples, the number of symbols for each waveform may be based on a PUCCH format configuration or rule specified in one or more 5G NR standards or specifications. In this example, the PUCCH resource indicated in the PRI may be a PUCCH resource having a number of symbols equal to the configured number of symbols for the waveform and PUCCH format.

In some examples, switching from one waveform (e.g., DFT-s-OFDM) to another waveform (e.g., CP-OFDM) for a particular PUCCH format (e.g., PUCCH format 2 or other short PUCCH format) may change the number of symbols from one symbol to two symbols or from two symbols to more than two symbols (e.g., three or more symbols). In this example, the demodulation reference signal (DMRS) overhead may be reduced as the number of symbols increases.

In some examples, the network entity may provide a semi-persistent command for waveform switching to the UE. For example, the semi-persistent command may change the waveform for PUCCH format 2 from CP-OFDM to DFT-s-OFDM or may change PUCCH format 2 to a different (new) short PUCCH format with a DFT-s-OFDM waveform. In some examples, the PUCCH format configuration may indicate whether the waveform of a PUCCH format may be switched by a semi-persistent command. In some examples, the semi-persistent command may be sent via DCI or a medium access control (MAC) control element (MAC-CE).

In some examples, PUCCH waveform switching may be based on UE capability. For example, the UE capability for PUCCH waveform switching may be per UE, per frequency range, per frequency band, per frequency band combination, or per bandwidth part.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station. In addition, one or more of the base stations may have a disaggregated configuration.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmissions. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
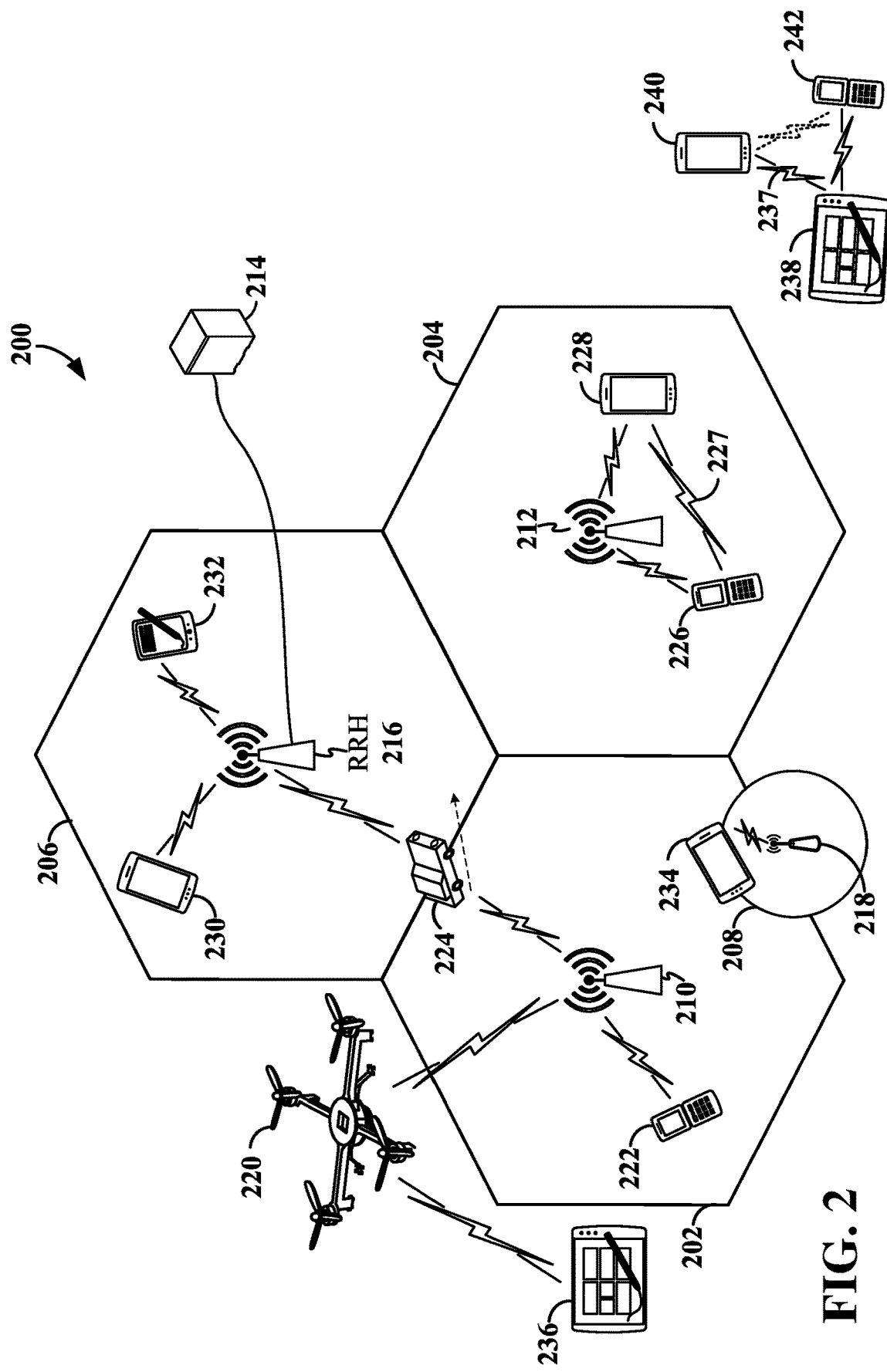
FIG. 2 is a diagram illustrating an example of a radio access network (RAN) according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP-OFDM). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
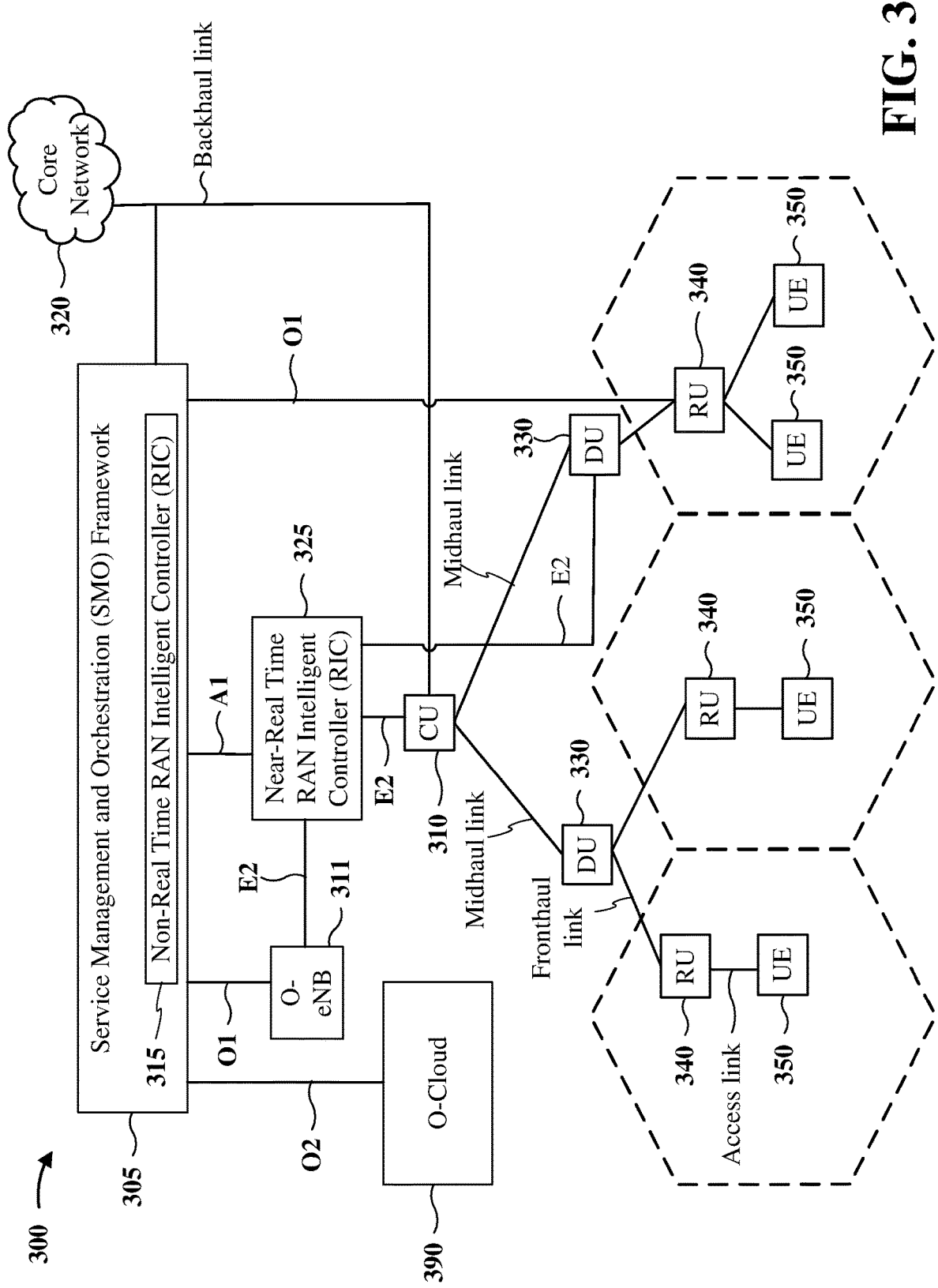
FIG. 3 is a diagram providing a high-level illustration of one example of a configuration of a disaggregated base station according to some aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 350 via one or more radio frequency (RF) access links. In some implementations, the UE 350 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units. In some aspects, the CU 310 may host one or more higher layer control functions.

Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 350. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 3G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Various aspects of the present disclosure will be described with reference to an OFDM waveform (e.g., a CP-OFDM waveform), schematically illustrated in FIG. 3. It should be understood by those of ordinary skill in the art that the various aspects of the present disclosure may be applied to an SC-FDMA waveform (e.g., a DFT-s-OFDM waveform) in substantially the same way as described herein below. That is, while some examples of the present disclosure may focus on an OFDM link for clarity, it should be understood that the same principles may be applied as well to SC-FDMA waveforms.

Figure 4:
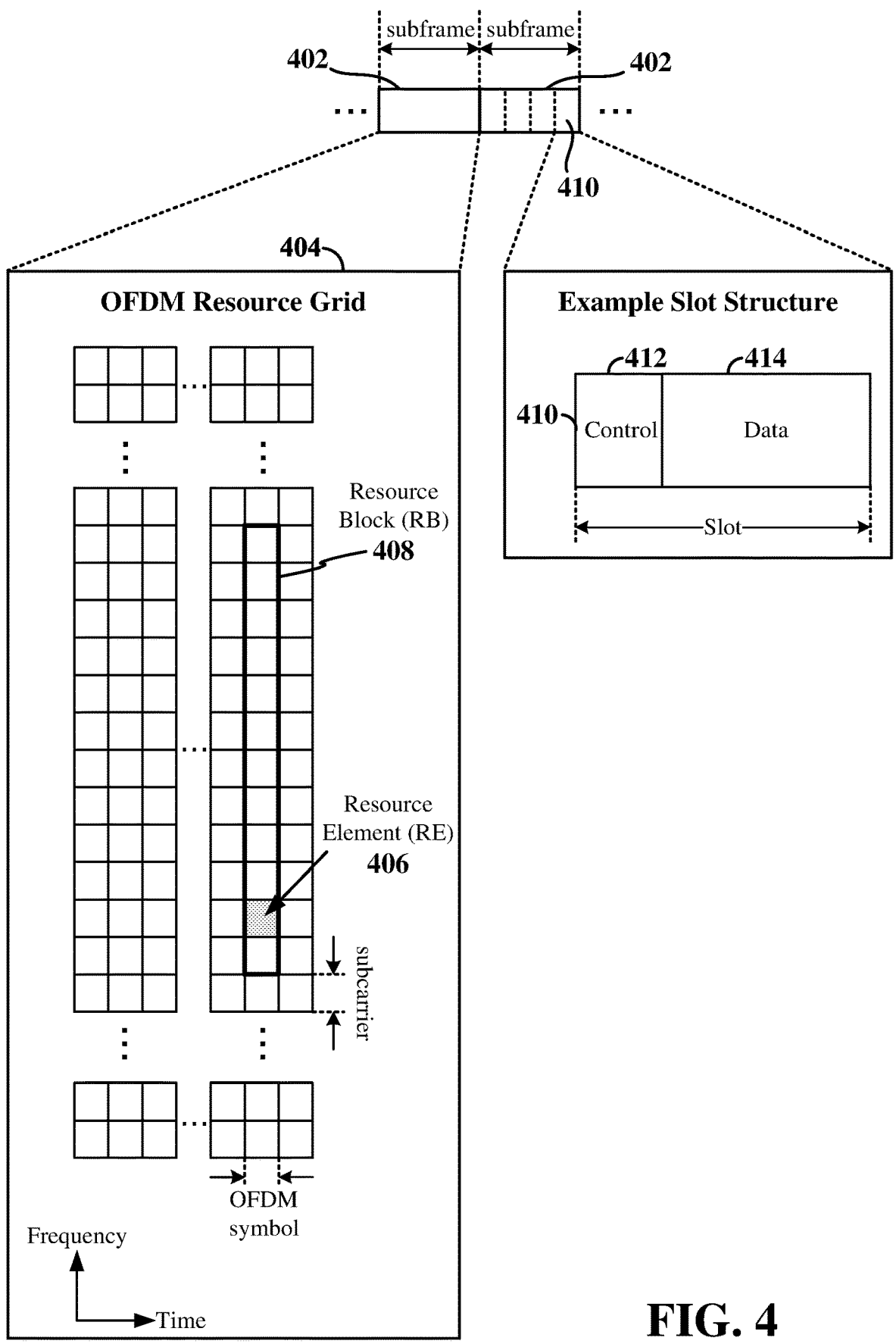
FIG. 4 is a schematic illustration of an organization of wireless resources in an air interface utilizing orthogonal frequency divisional multiplexing (OFDM) according to some aspects.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14

OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgement (ACK) or negative acknowledgement (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 5:
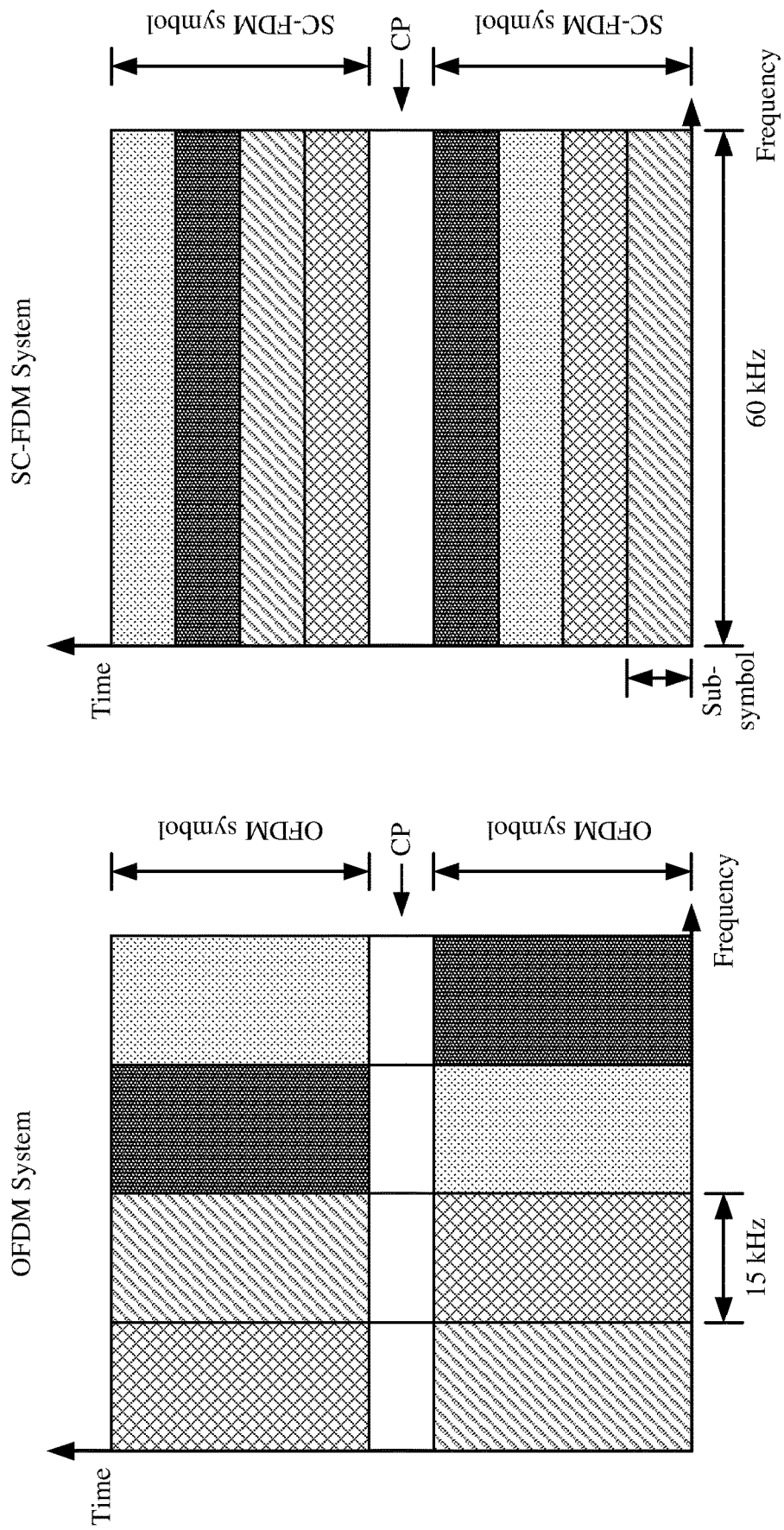
FIG. 5 is a schematic illustration of a comparison of orthogonal frequency division multiplexing (OFDM) and single-carrier frequency division multiplexing (SC-FDM) as may be implemented within a radio access network according to some aspects.

FIG. 5 is a schematic illustration of a comparison of CP-OFDM and SC-FDM (e.g., DFT-s-OFDM) as may be implemented within a radio access network, such as the RAN 200 illustrated in FIG. 2. In some examples, this illustration may represent wireless resources as they may be allocated in a CP-OFDM or SC-FDM system that utilizes multiple-input-multiple-output (MIMO). It should be understood that the concepts illustrated in FIG. 5 may also be applicable to a radio access network implementing OFDMA or SC-FDMA on a downlink channel and/or an uplink channel.

In a CP-OFDM system, a two-dimensional grid of resource elements (REs) may be defined by separation of frequency resources into closely spaced narrowband frequency subcarriers, and separation of time resources into a sequence of OFDM symbols having a given duration. In the example shown in FIG. 5, each RE is represented by a rectangle having the dimensions of one subcarrier (e.g., 15 kHz bandwidth) by one OFDM symbol (e.g., $\frac{1}{15}$ kHz=667 ms duration).

Thus, each RE represents a subcarrier modulated for the OFDM symbol period by one OFDM data symbol. Each OFDM symbol may be modulated using, for example, quadrature phase shift keying (QPSK), 16 quadrature amplitude modulation (QAM), 64 QAM, or any other suitable modulation. For simplicity, only four subcarriers over two OFDM symbol periods are illustrated. However, it should be understood that any number of subcarriers and OFDM symbol periods may be utilized within a slot or subframe. Within each OFDM symbol period, respective cyclic prefixes (CPs) may be inserted for each sub-carrier. The CP operates as a guard band between OFDM symbols and is typically generated by copying a small part of the end of an OFDM symbol to the beginning of the OFDM symbol.

By setting the spacing between the subcarriers based on the symbol rate, inter-symbol interference can be reduced or eliminated. OFDM channels support high data rates by allocating a data stream in a parallel manner across multiple sub-carriers. However, OFDM suffers from high peak-to-average power ratio (PAPR), which can make OFDM undesirable on the uplink, where UE (scheduled entity) transmit power efficiency and amplifier cost are important factors. In addition, OFDM may be undesirable for high band (e.g., above 52.6 GHz) networks, where the path loss is more severe.

In an SC-FDM system, a two-dimensional grid of resource elements (REs) may be defined by utilizing a wider bandwidth single carrier frequency, and separating the time resources into a sequence of SC-FDM symbols having a given duration. In the example shown in FIG. 5, a 60 kHz carrier is shown corresponding to the four 15 kHz subcarriers in the OFDM system. In addition, although the OFDM and SC-FDM symbols have the same duration, each SC-FDM symbol contains N "Sub-Symbols" that represent the modulated data symbols. Thus, in the example shown in FIG. 5 with four modulated data symbols, in the OFDM system, the four modulated data symbols are transmitted in parallel (one per sub-carrier), while in the SC-FDM system, the four modulated data symbols are transmitted in series at four times the rate, with each data symbol occupying 5×15 kHz bandwidth.

By transmitting the N data symbols in series at N times the rate, the SC-FDM bandwidth is the same as the multi-carrier OFDM system; however, the PAPR is greatly reduced. In general, as the number of subcarriers increases, the PAPR of the OFDM system approaches Gaussian noise statistics, but regardless of the number of subcarriers, the SC-FDM PAPR remains substantially the same. Thus, SC-FDM may provide benefits on the uplink by increasing the transmit power efficiency and reducing the power amplifier cost. In addition, SC-FDM may provide benefits in high band networks for better coverage.

Figures 6A, 6B:
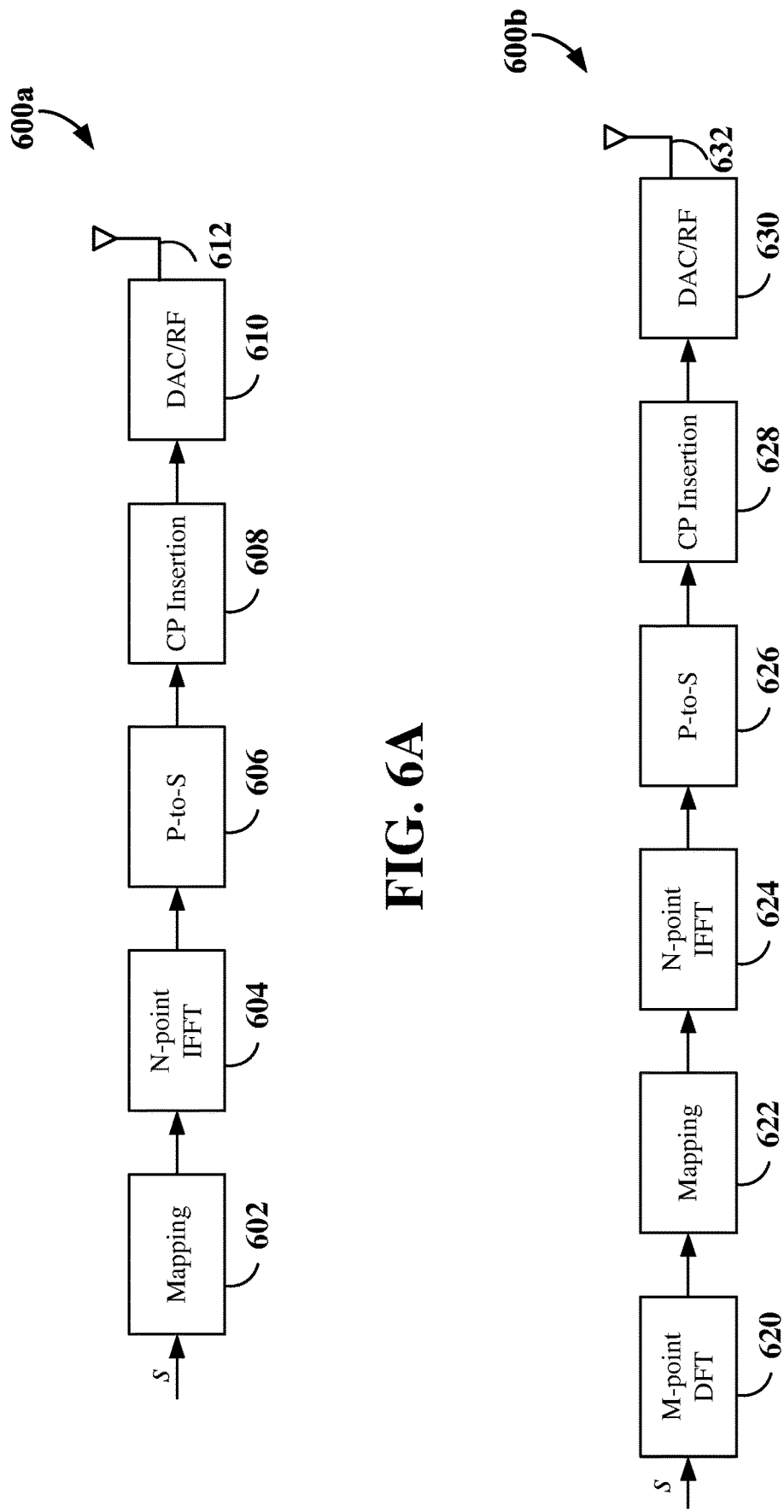
FIG. 6A is a schematic illustration of a transmitter configured to transmit and/or receive using a CP-OFDM waveform according to some aspects.
FIG. 6B is a schematic illustration of a transmitter configured to transmit and/or receive using a DFT-s-OFDM (e.g., SC-FDM) waveform according to some aspects.

FIG. 6A is a schematic illustration of a transmitter 600a within a RAN, such as the RAN 200 shown in FIG. 2, configured to transmit and/or receive using a CP-OFDM waveform according to some aspects. FIG. 6B is a schematic illustration of a transmitter 600b within a RAN, such as the RAN 200 shown in FIG. 2, configured to transmit and/or receive using a DFT-s-OFDM (e.g., SC-FDM) waveform according to some aspects. In some examples, each transmitter 600a and 600b may correspond to a UE or a network entity as shown in any of FIGS. 1-3.

In the example shown in FIG. 6A, the transmitter 600a may receive a symbol stream s, which may be of length M and be composed of complex modulated symbols generated from an original bit stream using a particular modulation scheme (e.g., QPSK, 16 QAM, 64 QAM, etc.). The symbol stream s may be encoded (not shown) and input to mapping circuitry 602 configured to map the encoded symbols onto the assigned subcarriers to produce modulated subcarriers. The modulated subcarriers then pass through an N-point inverse fast Fourier transform (IFFT) 604 for time domain conversion to produce respective OFDM symbols, as shown in FIG. 5.

The OFDM symbols output from the N-point IFFT 604 pass through a parallel-to-serial (P-to-S) converter 606 and cyclic prefix (CP) insertion circuitry 608, where guard intervals (e.g., cyclic prefixes) are inserted between OFDM symbols in order to reduce inter-symbol interference (ISI) caused by multi-path propagation and to produce CP-OFDM symbols. The CP-OFDM symbols are then input to a digital-to-analog converter (DAC)/radio frequency (RF) circuitry 610 for analog conversion and up-conversion of the analog signal to RF. The RF signal may then be transmitted via antenna 612.

In the example shown in FIG. 6B, the transmitter 600b may receive a symbol stream s, which may be of length M and be composed of complex modulated symbols generated from an original bit stream using a particular modulation scheme (e.g., QPSK, 16 QAM, 64 QAM, etc.). The symbol stream s may be encoded (not shown) and input to an M-point discrete Fourier transform (DFT) 620 (corresponding to the length M of the symbol stream), which performs DFT precoding on the symbol stream s. In general, the DFT 620 constructs a discrete frequency domain representation of the complex modulated symbols to produce precoded symbols. At the output of the DFT 620, the precoded symbols are then mapped onto the assigned subcarriers by mapping circuitry 622 to produce modulated subcarriers. In some examples, the assigned subcarriers form a set of contiguous tones representing a single carrier waveform. The modulated subcarriers then pass through an N-point inverse fast Fourier transform (IFFT) 624 for time domain conversion to produce respective SC-FDM sub-symbols, as shown in FIG. 5. Multiple SC-FDM sub-symbols may be transmitted within an SC-FDM symbol, as shown in FIG. 5. Thus, one SC-FDM symbol carries M complex modulated symbols.

The SC-FDM sub-symbols output from the N-point IFFT 624 pass through a parallel-to-serial (P-to-S) converter 626 and cyclic prefix (CP) insertion circuitry 628, where guard intervals (e.g., cyclic prefixes) are inserted between SC-FDM symbols (e.g., blocks of SC-FDM sub-symbols) in order to reduce inter-symbol interference (ISI) caused by multi-path propagation. The SC-FDM symbols and CPs are then input to a digital-to-analog converter (DAC)/radio frequency (RF) circuitry 630 for analog conversion and up-conversion of the analog signal to RF. The RF signal may then be transmitted via antenna 632. In the examples shown in FIGS. 6A and 6B, the transmitters 600a and 600b each include a single antenna 612 and 632, respectively. However, it should be understood that the transmitters 600a and 600b may each include any number of antennas.

In 5G NR, downlink transmissions of, for example, the PDCCH and PDSCH, are transmitted using a CP-OFDM waveform. For uplink transmissions, there are two waveform options, either CP-OFDM or DFTs-OFDM (e.g., SC-FDM). For example, the PUCCH may be transmitted using a CP-OFDM waveform or a DFT-s-OFDM waveform based on the PUCCH format used. Each 5G NR PUCCH format may be pre-configured within, for example, 3GPP Technical Specification (TS) 36.211, Release 15, Release 16, or Release 17. Thus, each PUCCH format may be fixed based on the specification.

FIG. 7 is a diagram illustrating an example of physical uplink control channel (PUCCH) formats according to some aspects. The formats shown in FIG. 7 may correspond, for example, to the PUCCH formats specified in 3GPP TS 36.211, Release 15. FIG. 7 illustrates a table 700 including a plurality of PUCCH formats 702, a respective length 704 (in number of OFDM symbols) for each of the PUCCH formats 702, a respective number of uplink control information (UCI) bits 706 for each of the PUCCH formats 702, a respective waveform 708 for each of the PUCCH formats 702, and a respective description 710 for each of the PUCCH formats 702. In the example shown in FIG. 7, there are five PUCCH formats 702 (e.g., PUCCH formats 0, 1, 2, 3, and 4). PUCCH formats 0 and 2 are short formats having a length 704 of one to two OFDM symbols. PUCCH formats 1, 3, and 4 are long formats having a length 704 between four and fourteen OFDM symbols. PUCCH format 3 does not have a multiplexing capability, while PUCCH format 4 does have a multiplexing capability (e.g., multiplexing with other UEs).

In addition, PUCCH formats 0 and 1 have a small payload size 706 of one or two bits (e.g., ≤2 UCI bits), whereas PUCCH formats 2, 3, and 4 have a larger payload size 706 of more than two bits (e.g., >2 UCI bits). Each PUCCH format 702 further has a predetermined waveform 708 associated therewith. For example, PUCCH formats 0 and 1 are transmitted using a computer-generated sequence (CGS) waveform, PUCCH format 2 is transmitted using the CP-OFDM waveform, and PUCCH formats 3 and 4 are transmitted using the DFT-s-OFDM waveform.

FIGS. 8A and 8B are diagrams illustrating examples of long PUCCH and short PUCCH according to some aspects. In the examples shown in FIGS. 8A and 8B, time is illustrated along the horizontal axis, while frequency is illustrated along the vertical axis. Each of FIGS. 8A and 8B illustrate a respective slot 802a and 802b, each including a plurality of symbols (e.g., fourteen OFDM or SC-FDM symbols) in the time domain. In addition, each of FIGS. 8A and 8B illustrate a respective BWP 804 including a subset of contiguous PRBs (e.g., each including a suitable number of subcarriers, such as twelve subcarriers) on a carrier in the frequency domain.

Each slot 802a and 802b includes a PDCCH 806 carrying DCI including downlink scheduling assignments and uplink scheduling grants. In some examples, the DCI may include scheduling information scheduling a PUSCH or PUCCH in the same or a subsequent slot. In other examples, the DCI may include scheduling information scheduling a PDSCH in the same or a subsequent slot. For example, as shown in FIG. 8B, the PDCCH 806 may schedule a PDSCH 810 transmitted within slot 802b.

Each slot 802a and 802b may further include a PUCCH carrying UCI. Examples of UCI may include, but are not limited to, a scheduling request (SR), HARQ-ACK bits (e.g., HARQ feedback information), channel state feedback (CSF), or other suitable UCI. As shown in the table of FIG. 7, PUCCH Formats 1, 3, and 4 are long PUCCH formats that occupy four to fourteen symbols, and PUCCH formats 0 and 2 are short PUCCH formats that occupy one or two symbols. FIG. 8A illustrates a long PUCCH 808a, whereas FIG. 8B illustrates a short PUCCH 808b.

In the long PUCCH 808a, symbols with DMRS are time division multiplexed with UCI symbols to maintain low PAPR, whereas in the short PUCCH 808b, DMRS subcarriers are frequency division multiplexed with UCI subcarriers. Whether a long PUCCH 808a or a short PUCCH 808b is used may depend, for example, on the number of UCI bits to be carried in the PUCCH, whether multi-UE multiplexing on the same PUCCH resources is needed, and the channel conditions.

The resources (e.g., time-frequency resources, such as the number of PRBs, starting PRB, starting symbol, and number of symbols) to be used for the PUCCH, hereinafter referred to as PUCCH resources, may be predefined or dynamically configured. For example, the PUCCH resources may be predefined by 3GPP, TS 38.213, Release 15-17, Table 9.2.1-1. As another example, the PUCCH resources may be dynamically configured via an RRC message (e.g., PUCCH-Config). In either example, a UE may be configured with up to four PUCCH resource sets for UCI transmissions including HARQ-ACK bits, where each PUCCH resource set may be used to transmit UCI within a range of payload sizes. For example, one of the PUCCH resource sets may be used for a maximum of two UCI bits (e.g., two HARQ-ACK bits). Here, this PUCCH resource set may include a maximum of 32 PUCCH resources. Other PUCCH resource sets may be applicable for more than two UCI bits, each with a different range of number of UCI bits and each with a maximum of 8 PUCCH resources. Each PUCCH resource set may have a PUCCH format (e.g., PUCCH format 0-4) associated therewith. A UE can select one of the configured PUCCH resource sets based on the UCI payload size. The UE can then further select a specific single PUCCH resource within the selected PUCCH resource set. For example, DCI may include a PUCCH resource indicator (PRI) identifying the specific PUCCH resource to use for a PUCCH transmission. The PRI may be, for example, a 3-bit field within DCI Format 1_0 or DCI Format 1_1. In some examples, the PUCCH format and time domain resource allocation may be determined by the PUCCH resource configuration, but the frequency domain resource allocation may not be explicitly specified. In this example, the frequency domain resource allocation may be determined by the DCI and the control channel element (CCE) location of the PDCCH carrying the DCI (e.g., based on the index of the first CCE of the PDCCH and the number of CCEs in a control resource set (CORESET) of the PDCCH).

As indicated above, each PUCCH format has a fixed waveform, as shown in the table 700 of FIG. 7. For example, the short PUCCH format 2 for more than two UCI bits is transmitted using CP-OFDM. In millimeter-wave systems (e.g., FR2 or higher frequency ranges), short formats of PUCCH, such as PUCCH format 2 are used to enable more frequent beam switching by the network entity (e.g., gNB). However, in situations where coverage is limited, DFT-s-OFDM may be preferred due to the lower PAPR, which results in lower power back-off.

Various aspects relate to mechanisms for waveform indication for PUCCH. For example, a network entity may provide an indication of a waveform for a PUCCH format to a UE. In some examples, the network entity may semi-statically or dynamically indicate the waveform to be used by the UE in transmitting a PUCCH with a particular PUCCH format to the network entity. In other examples, the network entity may send a semi-persistent command to the UE for waveform switching. In some examples, waveform switching may be based on UE capability.

Figure 9:
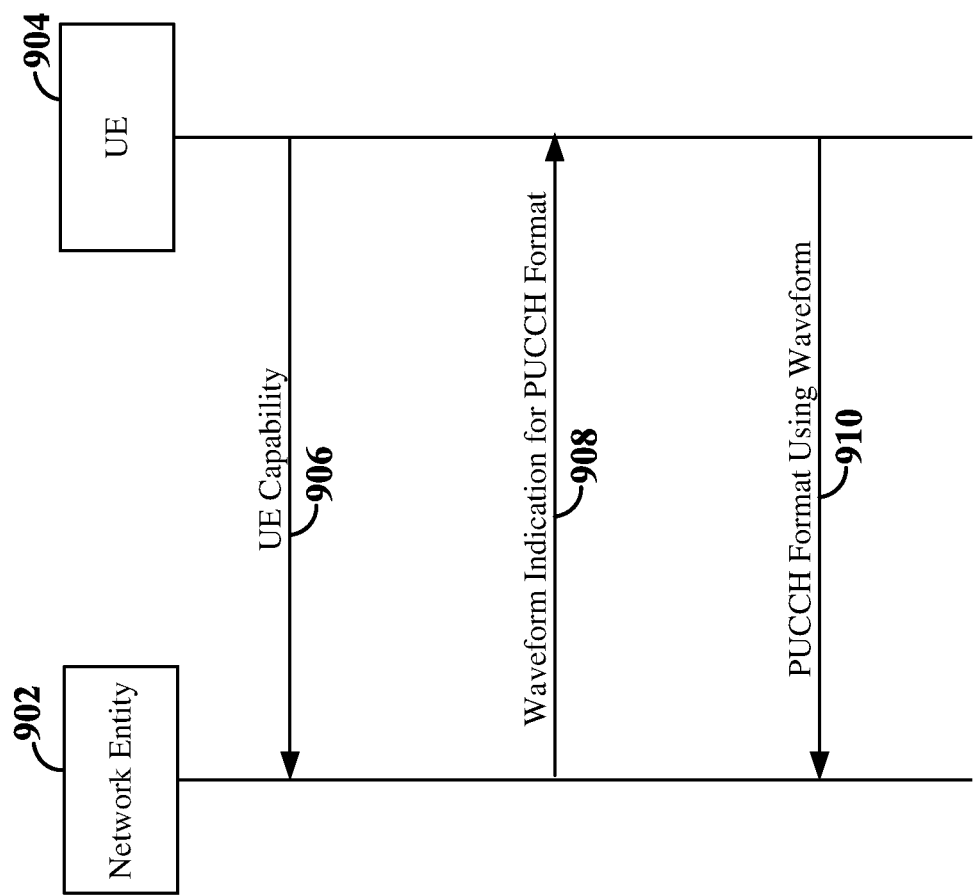
FIG. 9 is a signaling diagram illustrating exemplary signaling for PUCCH waveform indication according to some aspects.

FIG. 9 is a signaling diagram illustrating exemplary signaling between a network entity 902 and a UE 904 for PUCCH waveform indication according to some aspects. The UE 904 may correspond, for example, to any of the UEs or other scheduled entities shown in FIGS. 1 and/or 2. The network entity 902 may correspond, for example, to any of the network entities (e.g., a base station or gNB in an aggregated base station architecture, or a central unit (CU), a distributed unit (DU), a radio unit (RU), a Near-Real Time (Near-RT) RAN Intelligent Controller (RIC), or a Non-Real Time (Non-RT) RIC in a disaggregated base station architecture) shown in FIGS. 1, 2, and/or 3.

In the example shown in FIG. 9, at 906, the UE 904 may optionally provide a UE capability of the UE to the network entity 902. The UE capability may indicate, for example, whether the UE 904 supports waveform switching for PUCCH and/or supports different waveform types per PUCCH format. For example, the UE capability may indicate that the UE supports either CP-OFDM or DFT-s-OFDM for PUCCH format 2 and only DFT-s-OFDM for PUCCH formats 3 and 4. As another example, the UE capability may indicate that the UE supports only DFT-s-OFDM for PUCCH format 3, but supports either CP-OFDM or DFT-s-OFDM for PUCCH formats 2 and 4. As yet another example, the UE capability may indicate that the UE supports waveform switching between CP-OFDM and DFT-s-OFDM for any of PUCCH formats 2, 3, and 4. In some examples, the UE capability may indicate that the UE supports waveform switching between short PUCCH formats for more than two UCI bits (e.g., between PUCCH format 2 using CP-OFDM and a different (new) PUCCH format using DFT-s-OFDM). In some examples, the UE capability may be per frequency range (FR), per frequency band, per frequency band combination, or per bandwidth part (BWP).

At 908, the network entity 902 may provide a waveform indication for a PUCCH format to the UE 904. The waveform indication may indicate a waveform type (e.g., CP-OFDM, DFT-s-OFDM, or other suitable waveform type) for the PUCCH format. In some examples, the PUCCH format is the PUCCH format 2. In other examples, the PUCCH format is either the PUCCH format 2 or a different (new) short PUCCH format with more than two UCI bits. Here, the waveform type associated with PUCCH format 2 may be CP-OFDM, while the waveform type associated with the different short PUCCH format may be DFT-s-OFDM. In some examples, the waveform indication may indicate at least one parameter associated with the waveform. For example, the waveform indication may indicate a pulse shape and/or filter for the waveform. In this example, the waveform indication may not indicate the waveform type (e.g., the predefined waveform type for the PUCCH format may be used), but instead provide a different pulse shape and/or filter for the waveform type. In other examples, the waveform indication may indicate the waveform type (e.g., the predefined waveform type for the PUCCH format or a different waveform type for the PUCCH format) and the at least one parameter (e.g., pulse shape and/or filter) for the waveform type.

In some examples, the network entity 902 may semi-statically provide the waveform indication to the UE 904. For example, the network entity may provide an RRC message including an RRC configuration of the waveform type for the PUCCH format. The RRC configuration may be an RRC configuration of the PUCCH format that indicates the waveform type and other parameters associated with the PUCCH format (e.g., number of UCI bits, length (number of symbols) of the PUCCH, etc.). For example, for PUCCH format 2, the network entity 902 may semi-statically configure the waveform type to be either CP-OFDM or DFT-s-OFDM (or other suitable waveform type). In some examples, the RRC message may include at least one parameter associated with the waveform type and may further include (or not include) the waveform type, as indicated above.

In other examples, the network entity 902 may dynamically provide the waveform indication to the UE 904. For example, the waveform indication may correspond to a combination of a PUCCH resource configuration including a respective waveform configuration for each PUCCH resource (e.g., within a PUCCH resource set) and a PUCCH resource indicator (PRI) selecting one of the PUCCH resources within a PUCCH resource set for a PUCCH transmission, as described in more detail below. In still other examples, the waveform indication may correspond to a semi-persistent command for waveform switching, as described in more detail below.

At 910, the UE 904 may transmit a PUCCH with the PUCCH format and waveform type indicated in the waveform indication. For example, the UE 904 may transmit a PUCCH with PUCCH format 2 using a DFT-s-OFDM waveform. As another example, the UE 904 may transmit a PUCCH with PUCCH format 2 using a CP-OFDM waveform with one or more parameters indicated in the waveform indication. As yet another example, the UE 904 may transmit a PUCCH with a different (new) short PUCCH format using a DFT-s-OFDM waveform.

Figure 10:
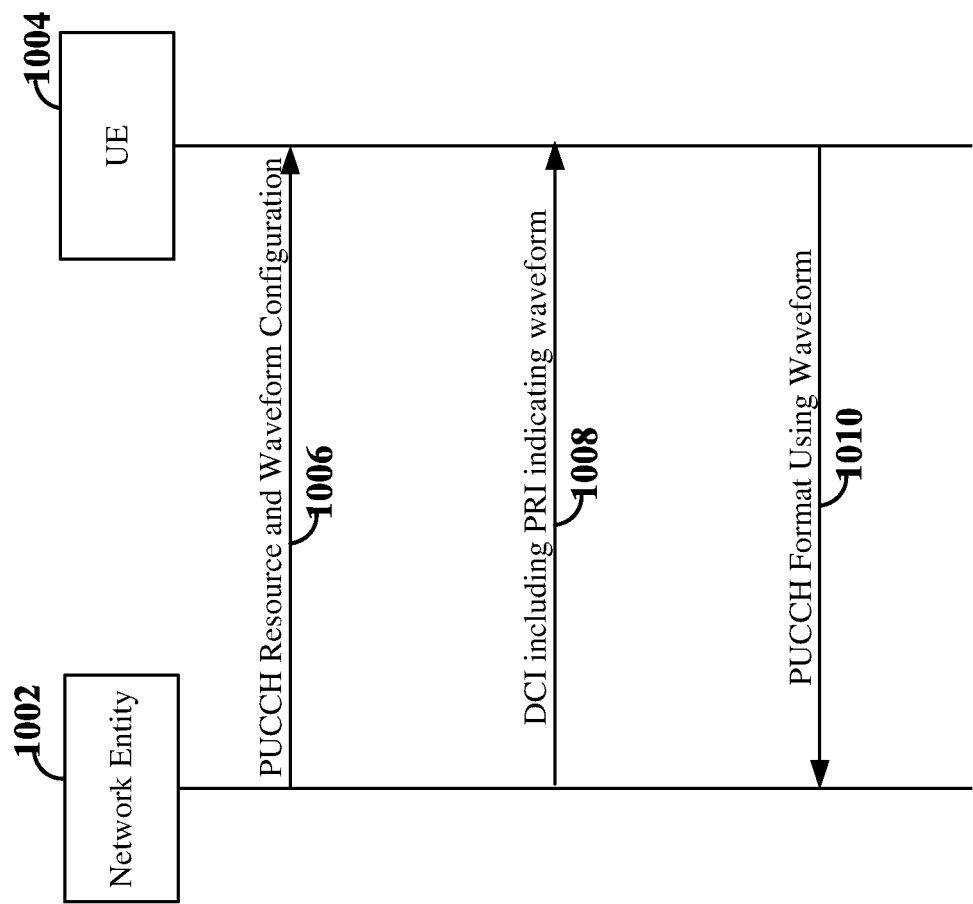
FIG. 10 is a signaling diagram illustrating exemplary signaling for dynamic PUCCH waveform indication according to some aspects.

FIG. 10 is a signaling diagram illustrating exemplary signaling between a network entity 1002 and a UE 1004 for dynamic PUCCH waveform indication according to some aspects. The UE 1004 may correspond, for example, to any of the UEs or other scheduled entities shown in FIGS. 1 and/or 2. The network entity 1002 may correspond, for example, to any of the network entities (e.g., a base station or gNB in an aggregated base station architecture, or a central unit (CU), a distributed unit (DU), a radio unit (RU), a Near-Real Time (Near-RT) RAN Intelligent Controller (RIC), or a Non-Real Time (Non-RT) RIC in a disaggregated base station architecture) shown in FIGS. 1, 2, and/or 3.

In the example shown in FIG. 10, at 1006, the network entity 1002 may provide a PUCCH resource and waveform configuration to the UE 1004. For example, the network entity 1002 may provide a PUCCH resource configuration indicating a respective waveform configuration (e.g., waveform type and/or parameter(s) associated with a waveform type) for each of a plurality of PUCCH resources. Here, each of the plurality of PUCCH resources may be included within a respective PUCCH resource set configured for the UE. For example, the PUCCH resource configuration (PUCCH-config) may include up to four PUCCH resource sets, each including a plurality of PUCCH resources. Each PUCCH resource set may be associated with a respective PUCCH format. The PUCCH resource configuration can further include a respective waveform type associated with each of the plurality of PUCCH resources.

An example of a PUCCH-config with two PUCCH resource sets follows:

```
pucch-Config setup: {
    resourceSetToAddModList {
        {
            pucch-ResourceSetID 0
            resourceList {
                Index 0: resourceid 0
                Index 1: resourceid 1
                ...
                Index 32 (max): resourceid (n-1)
            }
        },
        {
            pucch-ResourceSetID 1
            resourceList {
                Index 0: resourceid 0
                    waveform
                Index 1: resourceid 1
                    waveform
                ...
                Index 7 (max): resourceid (n-1)
                    waveform
            }
        }
}
```

In the above example, the first PUCCH resource set (pucch-ResourceSetID 0) may be associated with two or less UCI bits, whereas the second PUCCH resource set (pucch-ResourceSetID 1) may be associated with more than two UCI bits, and thus may be configured with either a CP-OFDM or DFT-s-OFDM waveform type (or other suitable waveform type). In some examples, the waveform field may indicate the waveform type, one or more parameters associated with a predefined waveform type for the PUCCH format associated with the PUCCH resource set, or both the waveform type and one or more parameters associated with the waveform type.

At 1008, the network entity 1002 may provide a PUCCH resource indicator (PRI) within downlink control information (DCI) to the UE 1004. The PRI indicates a PUCCH resource within a PUCCH resource set for the UE 1004 to utilize for a PUCCH transmission. For example, the UE 1004 may select the PUCCH resource set based on the number of UCI bits (UCI size) to be transmitted within the PUCCH. The UE 1004 may then use the PRI to select a particular PUCCH resource within the UE-selected PUCCH resource set. For example, if the UCI size is more than two bits, the UE 1004 can select the second PUCCH resource set (pucch-ResourceSetId 1). If the PRI is set to 1, the UE 1004 can select the PUCCH resource associated with Index 1 (resourceid i1) within the second PUCCH resource set, and utilize the waveform (e.g., waveform type and parameter(s) associated therewith) associated with resourceid i1.

In some examples, multiple waveform types and/or parameters may be configured for a PUCCH resource within the PUCCH-config (e.g., a waveform field of a particular PUCCH resource may indicate two or more different waveforms/parameter(s) that may be used for the PUCCH resource). In this example, the waveform (e.g., waveform type and/or parameter(s) associated with the waveform type) may be indicated based on the PRI, together with the control channel element (CCE) location of the PDCCH carrying the DCI (e.g., based on the index of the first CCE of the PDCCH and/or the number of CCEs in a control resource set (CORESET) of the PDCCH).

In other examples, instead of configuring a specific waveform for each PUCCH resource within the PUCCH resource configuration, the waveform may be indicated by the PRI together with the control channel element (CCE) location of the PDCCH carrying the DCI (e.g., based on the index of the first CCE of the PDCCH and/or the number of CCEs in a control resource set (CORESET) of the PDCCH).

At 1010, the UE 1004 may transmit a PUCCH with the PUCCH format and waveform type/parameters indicated by the PUCCH resource configuration and/or PRI. For example, the UE 1004 may transmit a PUCCH with PUCCH format 2 using a DFT-s-OFDM waveform. As another example, the UE 1004 may transmit a PUCCH with PUCCH format 2 using a CP-OFDM waveform with one or more parameters indicated in the waveform indication. As yet another example, the UE 1004 may transmit a PUCCH with a different (new) short PUCCH format using a DFT-s-OFDM waveform.

The dynamic waveform indication illustrated in FIG. 10 may be used, for example, for PUCCH transmissions including HARQ-ACK UCI bits. In some examples, the UE 1004 may transmit the PUCCH including acknowledgement information (e.g., HARQ-ACK bits) for a scheduled PDSCH (e.g., a dynamically scheduled PDSCH). In other examples, the UE 1004 may transmit the PUCCH including acknowledgement information for a semi-persistently scheduled (SPS) PDSCH based on an activating DCI activating an SPS configuration for the SPS PDSCH.

In some examples, using a different waveform type for a PUCCH format may result in a different number of symbols (e.g., OFDM symbols) being used to transmit the PUCCH. For example, changing from CP-OFDM to DFT-s-OFDM for a short PUCCH (e.g., PUCCH format 2) may change the number of OFDM symbols from one to two or from two to more than two (e.g., three or more OFDM symbols). In some examples, for dynamic indication of waveform, as shown in FIG. 10, the number of symbols may be based on the PUCCH resource configuration. For example, each PUCCH resource may indicate a number of symbols of the PUCCH resource. An example PUCCH resource configuration for the second PUCCH resource (pucch-ResourceId 2) follows:

```
{
    pucch-ResourceID 2
        waveform
        starting PRB
        intraslotFrequencyHopping
        secondHopPRB
        format 0
            format 0
            {
                initialCyclicShift
                nrofSymbols
                startingSymbolIndex
            }
}
```

Thus, the number of symbols (nrofSymbols) may be specified for a PUCCH resource. In addition, the waveform type (waveform) may further be specified for the PUCCH resource, and the UE 1004 may use the number of symbols and waveform type indicated by the PUCCH resource configuration to transmit the PUCCH.

In other examples, the number of symbols for each waveform type may be based on a PUCCH format configuration or rule specified in one or more 5G NR standards or specifications. In this example, the PUCCH resource indicated in the PRI may be a PUCCH resource having a number of symbols equal to the configured number of symbols for the waveform and PUCCH format. Thus, the network entity 1002 may select a PRI based on the configured number of symbols for the waveform associated with the PUCCH format (e.g., PUCCH resource set) to be used in transmitting the PUCCH.

If the number of symbols to be used in transmitting a PUCCH with a particular PUCCH format changes from the predefined number of symbols (e.g., as shown in FIG. 7), the DMRS overhead of the PUCCH may also change. For example, if the number of symbols of a short PUCCH (e.g., PUCCH format 2) changes from two symbols to more than two symbols, the DMRS overhead may be reduced, thus allowing more efficiency for DMRS.

Figures 11A, 11B:
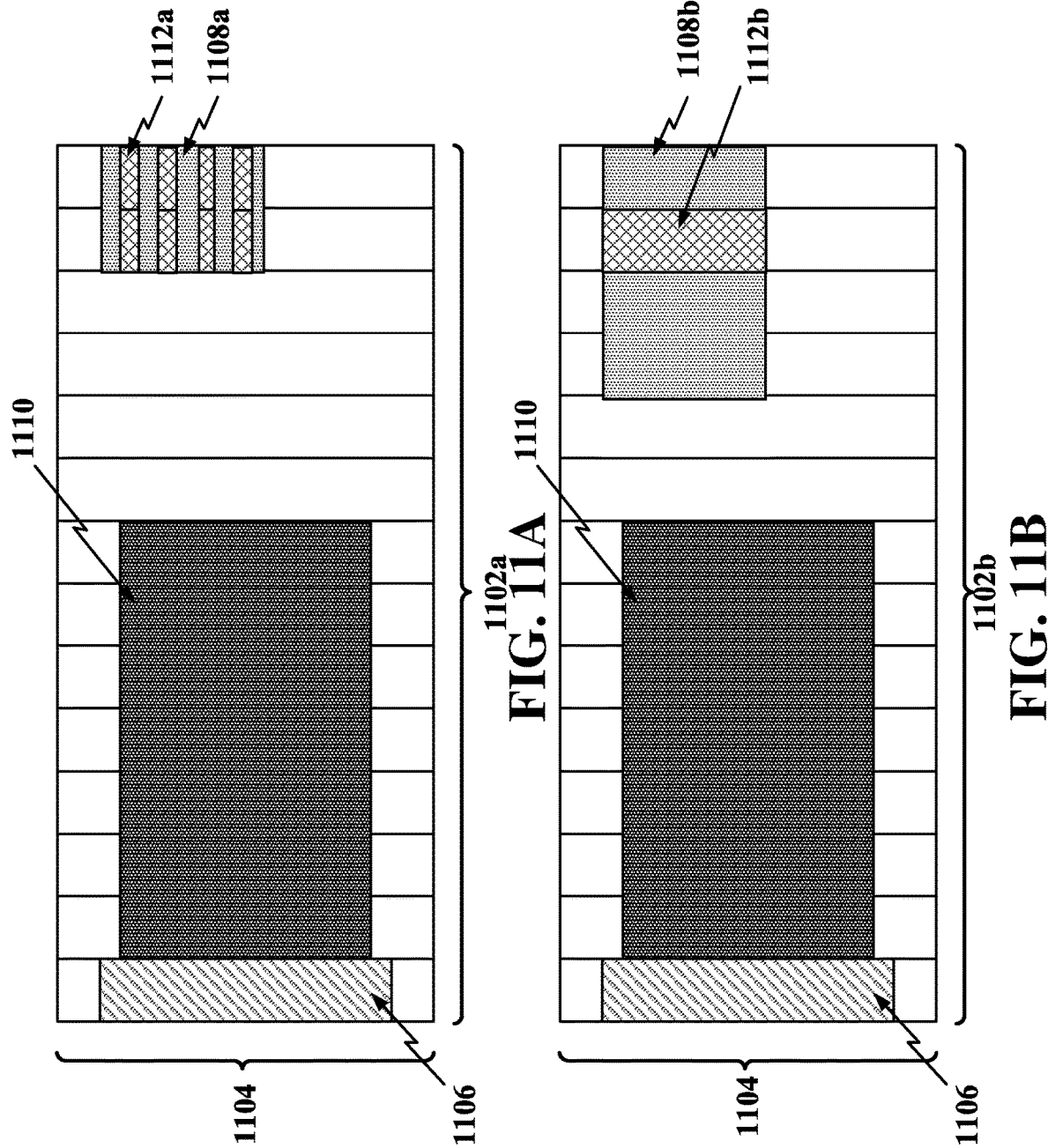
FIGS. 11A and 11B are diagrams illustrating examples of short PUCCH using different numbers of symbols according to some aspects.

FIGS. 11A and 11B are diagrams illustrating examples of short PUCCH using different numbers of symbols according to some aspects. In the examples shown in FIGS. 11A and 11B, time is illustrated along the horizontal axis, while frequency is illustrated along the vertical axis. Each of FIGS. 11A and 11B illustrate a respective slot 1102a and 1102b, each including a plurality of symbols (e.g., fourteen OFDM or SC-FDM symbols) in the time domain. In addition, each of FIGS. 11A and 11B illustrate a respective BWP 1104 including a subset of contiguous PRBs (e.g., each including a suitable number of subcarriers, such as twelve subcarriers) on a carrier in the frequency domain.

Each slot 1102a and 1102b includes a PDCCH 1106 carrying DCI including downlink scheduling assignments and uplink scheduling grants. In some examples, the DCI may include scheduling information scheduling a PUSCH or PUCCH in the same or a subsequent slot. In other examples, the DCI may include scheduling information scheduling a PDSCH in the same or a subsequent slot. For example, as shown in FIGS. 11A and 11B, the PDCCH 1106 may schedule a PDSCH 1110 to be transmitted within the same slot.

Each slot 1102a and 1102b may further include a respective PUCCH 1108a and 1108b carrying UCI, such as acknowledgement information (e.g., HARQ-ACK bits). In some examples, the UCI may include more than two bits. In the example shown in FIG. 11A, the PUCCH 1108a is a short PUCCH (e.g., PUCCH format 2) transmitted over two OFDM symbols using, for example, a CP-OFDM waveform. In addition, in the short PUCCH 1108a shown in FIG. 11A, DMRS subcarriers 1112a are frequency division multiplexed with UCI subcarriers.

In the example shown in FIG. 11B, the PUCCH 1108b has the same PUCCH format (e.g., PUCCH format 2) as in FIG. 11A, but the PUCCH 1108b is transmitted over four symbols using, for example, a DFT-s-OFDM waveform. For DFT-s-OFDM, one OFDM symbol is dedicated for DMRS 1112b in the PUCCH 1108b, which results in approximately the same amount of PUCCH resources (e.g., time-frequency resources) being used for the DMRS 1112b in the PUCCH 1108b shown in FIG. 11B as the DMRS 1112a in the PUCCH 1108a shown in FIG. 11A. However, since the PUCCH 1108b shown in FIG. 11B is spread out over four OFDM symbols, the DMRS overhead for the PUCCH 1108b shown in FIG. 11B is less than the DMRS overhead for the PUCCH 1108a shown in FIG. 11A. For example, the percentage of PUCCH resources (e.g., time-frequency resources) used for the DMRS 1112b in the PUCCH 1108b shown in FIG. 11B is less than the percentage of PUCCH resources used for the DMRS 1112a in the PUCCH 1108a shown in FIG. 11A. This leads to increased DMRS efficiency in the short PUCCH transmission.

Figure 12:
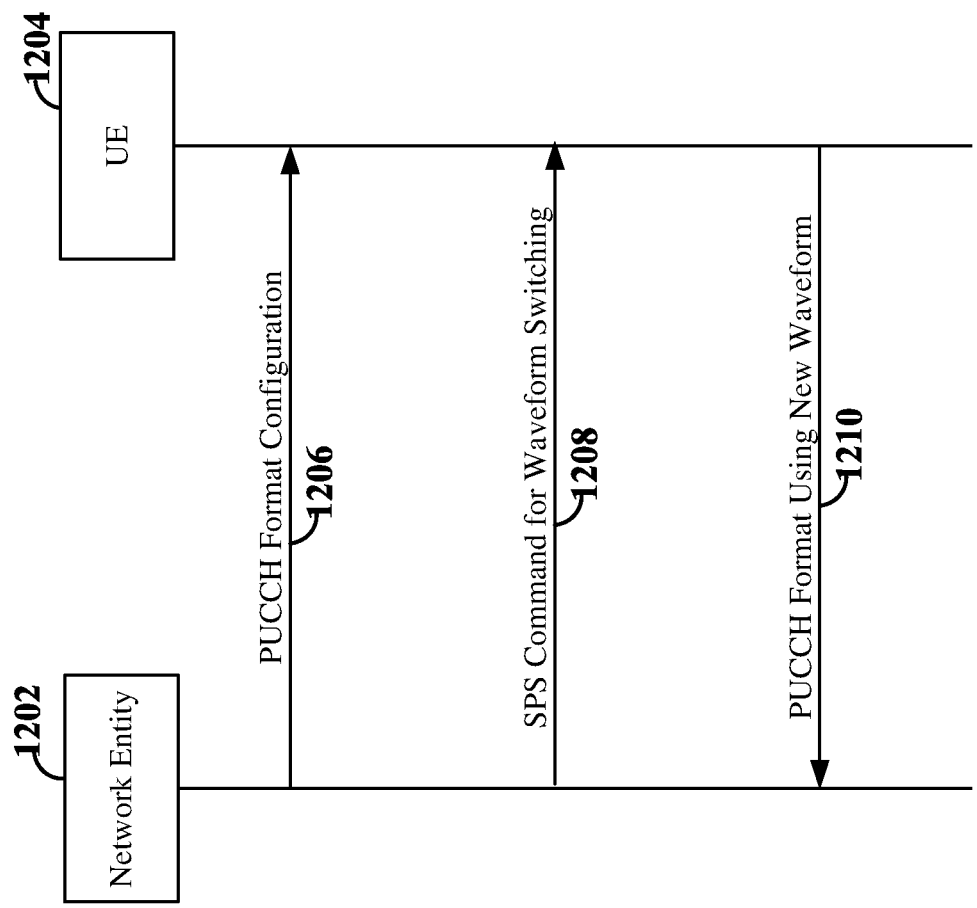
FIG. 12 is a signaling diagram illustrating exemplary signaling for PUCCH waveform switching according to some aspects.

FIG. 12 is a signaling diagram illustrating exemplary signaling between a network entity 1202 and a UE 1204 for PUCCH waveform switching according to some aspects. The UE 1204 may correspond, for example, to any of the UEs or other scheduled entities shown in FIGS. 1 and/or 2. The network entity 1202 may correspond, for example, to any of the network entities (e.g., a base station or gNB in an aggregated base station architecture, or a central unit (CU), a distributed unit (DU), a radio unit (RU), a Near-Real Time (Near-RT) RAN Intelligent Controller (RIC), or a Non-Real Time (Non-RT) RIC in a disaggregated base station architecture) shown in FIGS. 1, 2, and/or 3.

In the example shown in FIG. 12, at 1206, the network entity 1202 may optionally provide a PUCCH format configuration to the UE 1204. For example, the network entity 1202 may transmit an RRC configuration of the PUCCH format (e.g., PUCCH format 2 or a different (new) PUCCH format) indicating the number of UCI bits, the length (number of OFDM symbols) of the PUCCH, the waveform type, and other suitable parameters. In other examples, the PUCCH format may be predefined (e.g., via 3GPP standards or specifications).

At 1208, the network entity 1202 may provide a semi-persistent (SPS) command for waveform switching to the UE 1204. For example, PUCCH format 2 may be configured with CP-OFDM (e.g., via the PUCCH format configuration sent at 1206 or via a predefined standard or specification). In this example, the SPS command may indicate that PUCCH format 2 should switch from CP-OFDM to DFT-s-OFDM. In some examples, the PUCCH format configuration sent at 1206 may indicate whether waveform switching for PUCCH format 2 is allowed. If waveform switching is allowed, the UE 1204 may switch from using a CP-OFDM waveform to a DFT-s-OFDM waveform for PUCCH transmissions with PUCCH format 2. In other examples, a different (new) short PUCCH format may be configured (e.g., via the PUCCH format configuration at 1206 or via 3GPP standards or specifications) with a different waveform, such as DFT-s-OFDM. In this example, the SPS command may indicate that the UE 1204 should switch from using PUCCH format 2 with a CP-OFDM waveform to the different (new) short PUCCH format with a DFT-s-OFDM waveform for short PUCCH transmissions. The SPS command may be sent via, for example, DCI or MAC-CE.

At 1210, the UE 1204 may transmit a PUCCH with a PUCCH format and waveform type indicated in the SPS command. For example, the UE 1204 may transmit a PUCCH with PUCCH format 2 using a DFT-s-OFDM waveform. As another example, the UE 1204 may transmit the PUCCH with a different (new) PUCCH format using a DFT-s-OFDM waveform. The UE 1204 may continue to use the waveform type indicated in the SPS command for the PUCCH format (e.g., PUCCH format 2 or a different (new) PUCCH format) until a new SPS command is received again switching the waveform (e.g., switching from DFT-s-OFDM to CP-OFDM) for same length range PUCCH transmissions (e.g., PUCCH transmissions using a short PUCCH format).

Figure 13:
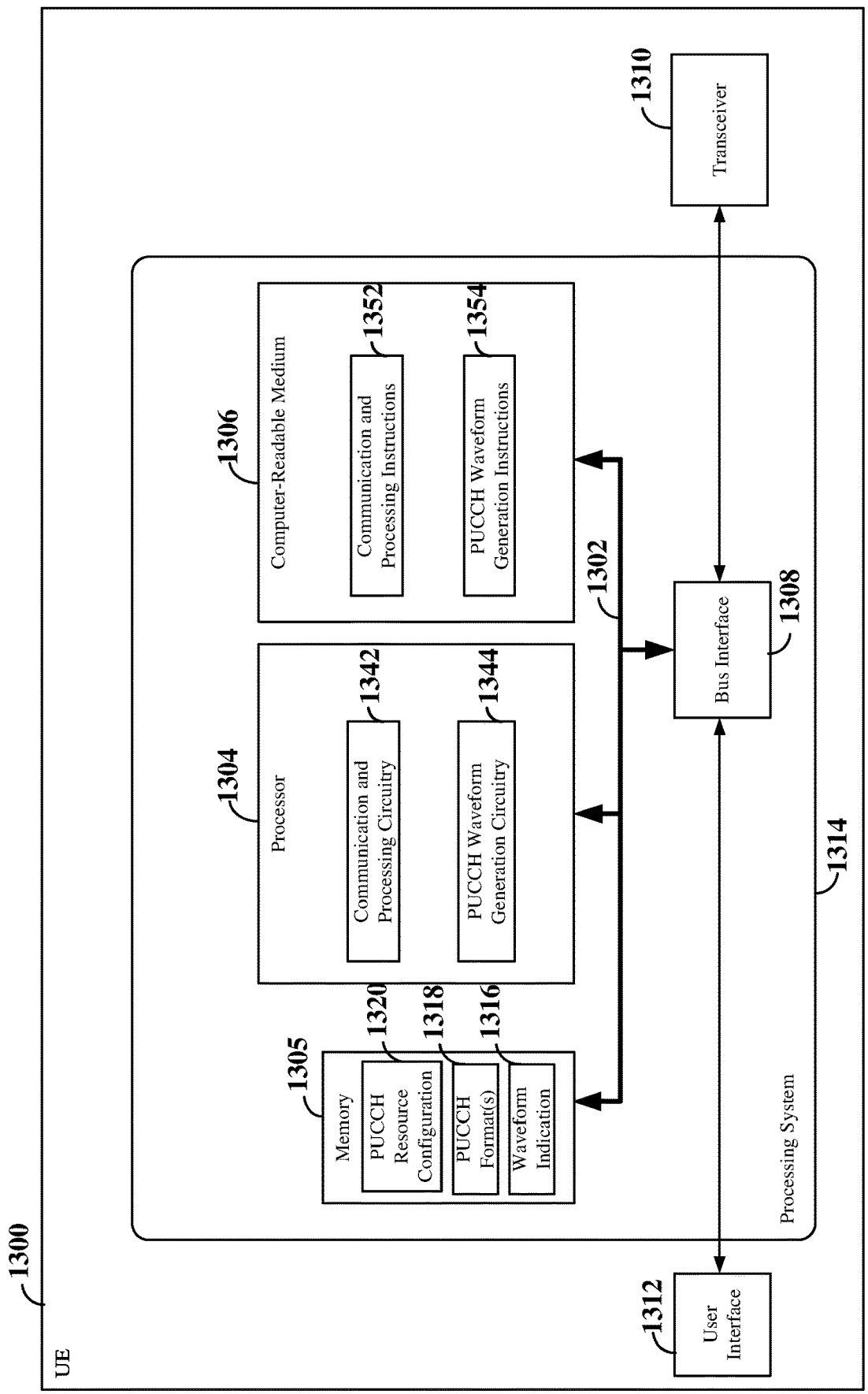
FIG. 13 is a block diagram illustrating an example of a hardware implementation for a user equipment employing a processing system according to some aspects.

FIG. 13 is a block diagram illustrating an example of a hardware implementation of a user equipment (UE) 1300 employing a processing system 1314 according to some aspects. The UE 1300 may be any of the UEs or other scheduled entities illustrated in any one or more of FIGS. 1, 2, 9, 10, and/or 12.

In accordance with various aspects of the disclosure, an element, or any portion of an element, or any combination of elements may be implemented with a processing system 1314 that includes one or more processors, such as processor 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. That is, the processor 1304, as utilized in the UE 1300, may be used to implement any one or more of the methods or processes described and illustrated, for example, in FIG. 9 or 14.

The processor 1304 may in some instances be implemented via a baseband or modem chip and in other implementations, the processor 1304 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits, including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, are not described any further.

A bus interface 1308 provides an interface between the bus 1302 and a transceiver 1310. The transceiver 1310 may be, for example, a wireless transceiver. The transceiver 1310 provides a means for communicating with various other apparatus over a transmission medium (e.g., air interface). The bus interface 1308 further provides an interface between the bus 1302 and a user interface 1312 (e.g., keypad, display, touch screen, speaker, microphone, control features, etc.). Of course, such a user interface 1312 may be omitted in some examples.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. In some examples, the computer-readable medium 1306 may be part of the memory 1305. Those skilled in the art will recognize how best to implement the described functionality presented throughout this disclosure depending on the particular application and the overall design constraints imposed on the overall system. In some examples, the computer-readable medium 1306 may be implemented on an article of manufacture, which may further include one or more other elements or circuits, such as the processor 1304 and/or memory 1305.

The computer-readable medium 1306 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

One or more processors, such as processor 1304, may be responsible for managing the bus 1302 and general processing, including the execution of the software (e.g., instructions or computer-executable code) stored on the computer-readable medium 1306. The software, when executed by the processor 1304, causes the processing system 1314 to perform the various processes and functions described herein for any particular apparatus. The computer-readable medium 1306 and/or the memory 1305 may also be used for storing data that may be manipulated by the processor 1304 when executing software. For example, the memory 1305 may store one or more waveform indication(s) 1316, one or more PUCCH format(s) 1318, and a PUCCH resource configuration 1320 that may be used by the processor in communicating a PUCCH.

In some aspects of the disclosure, the processor 1304 may include circuitry configured for various functions. For example, the processor 1304 may include communication and processing circuitry 1342 configured to communicate with a network entity (e.g., an aggregated or disaggregated base station, such as a gNB or eNB). In some examples, the communication and processing circuitry 1342 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1342 may include one or more transmit/receive chains.

In some implementations where the communication involves receiving information, the communication and processing circuitry 1342 may obtain information from a component of the UE 1300 (e.g., from the transceiver 1310 that receives the information via radio frequency signaling or some other type of signaling suitable for the applicable communication medium), process (e.g., decode) the information, and output the processed information. For example, the communication and processing circuitry 1342 may output the information to another component of the processor 1304, to the memory 1305, or to the bus interface 1308. In some examples, the communication and processing circuitry 1342 may receive one or more of signals, messages, other information, or any combination thereof. In some examples, the communication and processing circuitry 1342 may receive information via one or more channels. In some examples, the communication and processing circuitry 1342 may include functionality for a means for receiving. In some examples, the communication and processing circuitry 1342 may include functionality for a means for processing, including a means for demodulating, a means for decoding, etc.

In some implementations where the communication involves sending (e.g., transmitting) information, the communication and processing circuitry 1342 may obtain information (e.g., from another component of the processor 1304, the memory 1305, or the bus interface 1308), process (e.g., modulate, encode, etc.) the information, and output the processed information. For example, the communication and processing circuitry 1342 may output the information to the transceiver 1310 (e.g., that transmits the information via radio frequency signaling or some other type of signaling suitable for the applicable communication medium). In some examples, the communication and processing circuitry 1342 may send one or more of signals, messages, other information, or any combination thereof. In some examples, the communication and processing circuitry 1342 may send information via one or more channels. In some examples, the communication and processing circuitry 1342 may include functionality for a means for sending (e.g., a means for transmitting). In some examples, the communication and processing circuitry 1342 may include functionality for a means for generating, including a means for modulating, a means for encoding, etc.

In some examples, the communication and processing circuitry 1342 may be configured to receive (e.g., via the transceiver 1310) an indication (e.g., waveform indication 1316) of a waveform type for a first format (e.g., one of the PUCCH format(s) 1318) of a PUCCH from a network entity. In some examples, the waveform type may include CP-OFDM or DFT-s-OFDM. In some examples, the first format includes PUCCH format 2. In some examples, the first format includes PUCCH format 2 or a different (new) short PUCCH format with more than two bits. In this example, the waveform type associated with PUCCH format 2 may be CP-OFDM, whereas the waveform type associated with the different PUCCH format may be DFT-s-OFDM. In some examples, the indication 1316 may indicate at least one parameter (e.g., pulse shape and/or filter) associated with the waveform type.

In some examples, the indication 1316 is a semi-static indication. In this example, the communication and processing circuitry 1342 may be configured to receive (e.g., via the transceiver 1310) an RRC configuration of the waveform type for the first format of the PUCCH. In some examples, the indication 1316 is a dynamic indication. In this example, the communication and processing circuitry 1342 may be configured to receive (e.g., via the transceiver 1310) a PUCCH resource configuration (e.g., PUCCH resource configuration 1320) indicating a respective waveform configuration for each of a plurality of PUCCH resources. In addition, the communication and processing circuitry 1342 may be configured to receive a PUCCH resource indicator (PRI) within downlink control information (DCI). The PRI may indicate a PUCCH resource of the plurality of PUCCH resources for the PUCCH. The PRI may further indicate the waveform type for the first format of the PUCCH based on the PUCCH resource.

In some examples, the respective waveform configuration for each of the plurality of PUCCH resources within the PUCCH resource configuration 1320 may indicate one of at least two waveform types and a respective number of symbols (e.g., OFDM symbols) associated with the respective waveform configuration. In this example, the PRI may further indicate the number of symbols of the PUCCH based on the PUCCH resource.

In some examples, the indication 1316 is a semi-persistent command for waveform switching from a first waveform type to a second waveform type for the PUCCH. In some examples, the first waveform type is associated with a second format (e.g., one of the PUCCH format(s) 1318) having a same length range as the first format. In some examples, the communication and processing circuitry 1342 may be configured to receive (e.g., via the transceiver 1310) the semi-persistent command for waveform switching via one of DCI or a MAC-CE.

In some examples, the communication and processing circuitry 1342 may further be configured to transmit (e.g., via the transceiver 1310) a capability of the UE for waveform switching. For example, the capability of the UE may be based on at least one of a frequency range, a frequency band, a band combination, or a BWP of the PUCCH. In this example, the indication 1316 of the waveform type for the first format of the PUCCH may be based on the capability of the UE. The communication and processing circuitry 1342 may further be configured to execute communication and processing instructions (software) 1352 stored on the computer-readable medium 1306 to implement one or more functions described herein.

The processor 1304 may further include PUCCH waveform generation circuitry 1344 configured to generate and communicate the PUCCH using the waveform type for the first format via the communication and processing circuitry 1342 and the transceiver 1310. In some examples, the PUCCH may include acknowledgement information for a scheduled PDSCH. In other examples, the PUCCH may include acknowledgement information for a semi-persistently scheduled (SPS) PDSCH based on an activating DCI activating an SPS configuration for the SPS PDSCH.

In some examples, the PUCCH waveform generation circuitry 1344 may be configured to switch from a first waveform type having a first number of symbols (e.g., OFDM symbols) to a second waveform type having a second number of symbols different than the first number of symbols. In some examples, the second number of symbols is greater than the first number of symbols. In this example, a first overhead of demodulation reference signals (DMRSs)

for the first number of symbols is greater than a second overhead of DMRSs for the second number of symbols. The PUCCH waveform generation circuitry 1344 may further be configured to execute PUCCH waveform generation instructions (software) 1354 stored on the computer-readable medium 1306 to implement one or more functions described herein.

Figure 14:
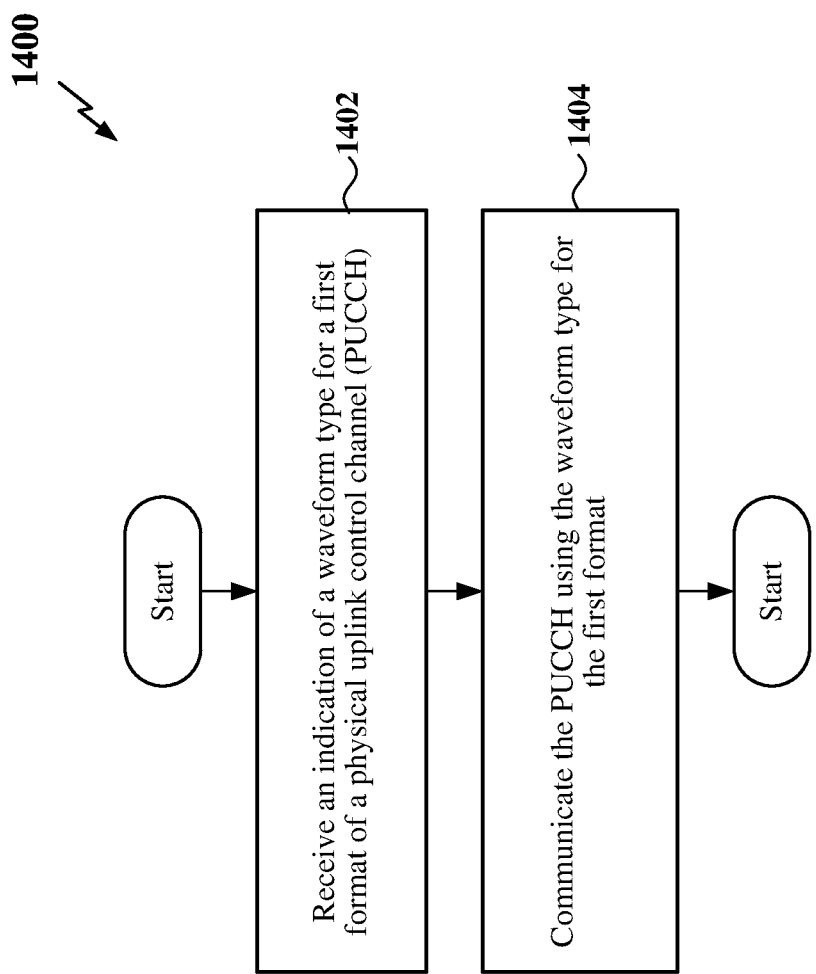
FIG. 14 is a flow chart of an exemplary process for PUCCH waveform indication according to some aspects.

FIG. 14 is a flow chart illustrating an exemplary process 1400 for PUCCH waveform indication according to some aspects. As described below, some or all illustrated features may be omitted in a particular implementation within the scope of the present disclosure, and some illustrated features may not be required for implementation of all embodiments. In some examples, the process 1400 may be carried out by the UE 1300 illustrated in FIG. 13. In some examples, the process 1400 may be carried out by any suitable apparatus or means for carrying out the functions or algorithm described below.

At block 1402, the UE may receive an indication of a waveform type for a first format of a physical uplink control channel (PUCCH). In some examples, the waveform type includes cyclic prefix-orthogonal frequency division multiplexing (CP-OFDM) or discrete Fourier transform-spread-OFDM (DFT-s-OFDM). In some examples, the first format includes PUCCH format 2. In some examples, the first format includes PUCCH format 2 or a different short PUCCH format with more than two bits. In this example, the waveform type associated with the PUCCH format 2 includes CP-OFDM and the waveform type associated with the different short PUCCH format includes DFT-s-OFDM. In some examples, the indication indicates at least one parameter associated with the waveform type.

In some examples, the indication is a semi-static indication. In this example, the UE may receive a radio resource control (RRC) configuration of the waveform type for the first format of the PUCCH. In some examples, the indication includes a dynamic indication. In this example, the UE may receive a PUCCH resource configuration indicating a respective waveform configuration for each of a plurality of PUCCH resources. In addition, the UE may receive a PUCCH resource indicator (PRI) within downlink control information (DCI). The PRI indicates a PUCCH resource of the plurality of PUCCH resources for the PUCCH. The PRI further indicates the waveform type for the first format of the PUCCH based on the PUCCH resource.

In some examples, the respective waveform configuration for each of the plurality of PUCCH resources within the PUCCH resource configuration indicates one of at least two waveform types and a respective number of symbols (e.g., OFDM symbols) associated with the respective waveform configuration. In this example, the PRI further indicates the number of symbols of the PUCCH based on the PUCCH resource.

In some examples, the UE may receive a semi-persistent command for waveform switching from a first waveform type to a second waveform type for the PUCCH. In some examples, the first waveform type is associated with a second format of the PUCCH having a same length range as the first format. In some examples, the UE receives the semi-persistent command for waveform switching via one of downlink control information (DCI) or a medium access control (MAC) control element (MAC-CE). In some examples, the UE may receive the indication of the waveform type for the first format of the PUCCH based on a capability of the UE. In some examples, the capability of the UE is based on at least one of a frequency range, a frequency band, a band combination, or a bandwidth part (BWP) of the PUCCH. For example, the communication and processing circuitry 1342 together with the transceiver 1310 shown and described above in connection with FIG. 13 may provide a means to receive the indication of the waveform type for the first format of the PUCCH.

At block 1404, the UE may communicate the PUCCH using the waveform type for the first format. In some examples, the PUCCH includes acknowledgement information for a scheduled physical downlink shared channel (PDSCH). In other examples, the PUCCH includes acknowledgement information for a semi-persistently scheduled (SPS) PDSCH based on an activating DCI activating an SPS configuration for the SPS PDSCH. In some examples, the UE may switch from a first waveform type having a first number of symbols to a second waveform type having a second number of symbols different than the first number of symbols for the first format of the PUCCH. In some examples, the second number of symbols is greater than the first number of symbols, and a first overhead of demodulation reference signals (DMRSs) for the first number of symbols is greater than a second overhead of DMRSs for the second number of symbols. For example, the PUCCH waveform generation circuitry 1344, together with the communication and processing circuitry 1342 and transceiver 1310, shown and described above in connection with FIG. 13 may provide a means to communicate the PUCCH using the waveform type for the first format.

In one configuration, the UE includes means for receiving an indication of a waveform type for a first format of a physical uplink control channel (PUCCH) and means for communicating the PUCCH using the waveform type for the first format. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 2, 6, and 13, and utilizing, for example, the processes and/or algorithms described herein in relation to FIGS. 9, 10, 12, and 14.

Figure 15:
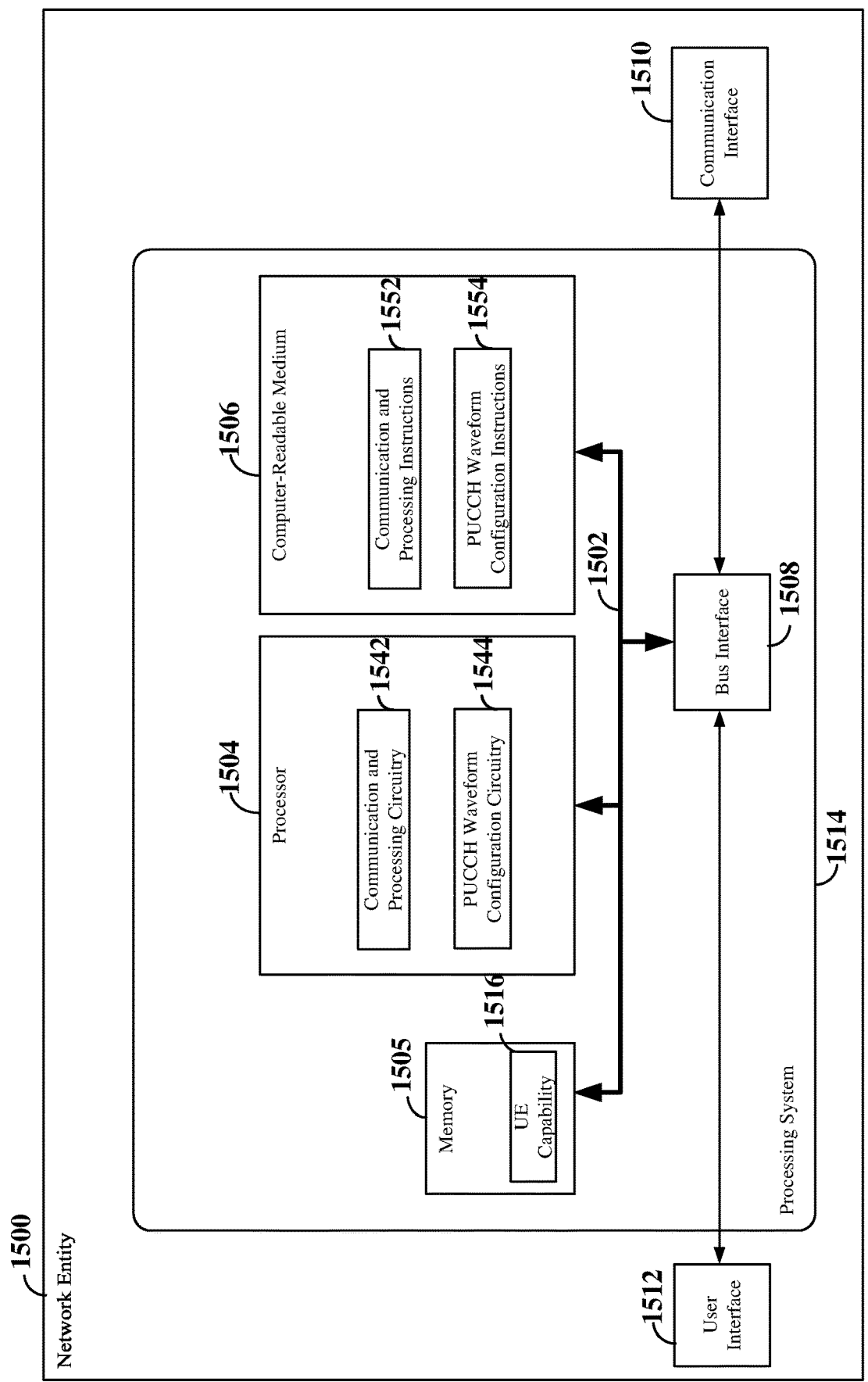
FIG. 15 is a block diagram illustrating an example of a hardware implementation for a network entity employing a processing system according to some aspects.

FIG. 15 is a block diagram illustrating an example of a hardware implementation of a network entity 1500 employing a processing system 1514 according to some aspects. The network entity 1500 may be, for example, any base station (e.g., gNB, eNB) or other scheduling entity as illustrated in any one or more of FIGS. 1-3, 9, 10, and/or 12. The network entity 1500 may further be implemented in an aggregated or monolithic base station architecture, or in a disaggregated base station architecture, and may include one or more of a central unit (CU), a distributed unit (DU), a radio unit (RU), a Near-Reg Time (Near-RT) RAN Intelligent Controller (RIC), or a Non-Real Time (Non-RT) RIC. In addition, the network entity 1500 may be a stationary network entity or a mobile network entity.

In accordance with various aspects of the disclosure, an element, or any portion of an element, or any combination of elements may be implemented with a processing system 1514 that includes one or more processors, such as processor 1504. The processing system 1514 may be substantially the same as the processing system 1314 as shown and described above in connection with FIG. 13, including a bus interface 1508, a bus 1502, a memory 1505, a processor 1504, and a computer-readable medium 1506. Accordingly, their descriptions will not be repeated for the sake of brevity. Furthermore, the network entity 1500 may include an optional user interface 1512 and a communication interface 1510. The communication interface 1510 may provide an interface (e.g., wireless or wired) between the network entity 1500 and a plurality of transmission and reception points (TRPs), a core network node, and/or a plurality of UEs. In some examples, the communication interface 1510 may include a wireless transceiver.

The processor 1504, as utilized in the network entity 1500, may be used to implement any one or more of the processes described below. In some examples, the memory 1505 may store a UE capability 1516 of a UE.

In some aspects of the disclosure, the processor 1504 may include communication and processing circuitry 1542 configured for various functions, including, for example, communicating with one or more UEs or other scheduled entities, or a core network node. In some examples, the communication and processing circuitry 1542 may communicate with one or more UEs via one or more TRPs associated with the network entity 1500. In some examples, the communication and processing circuitry 1542 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1542 may be configured to process and transmit downlink traffic and downlink control and receive and process uplink traffic and uplink control.

In some examples, the communication and processing circuitry 1542 may be configured to provide (e.g., via the communication interface 1510) an indication of a waveform type for a first format of a PUCCH. The indication may be provided, for example, to one or more UEs. In some examples, the waveform type may include CP-OFDM or DFT-s-OFDM. In some examples, the first format includes PUCCH format 2. In some examples, the first format includes PUCCH format 2 or a different (new) short PUCCH format with more than two bits. In this example, the waveform type associated with PUCCH format 2 may be CP-OFDM, whereas the waveform type associated with the different PUCCH format may be DFT-s-OFDM. In some examples, the indication may indicate at least one parameter (e.g., pulse shape and/or filter) associated with the waveform type.

In some examples, the indication is a semi-static indication. In this example, the communication and processing circuitry 1542 may be configured to provide (e.g., via the communication interface 1510) an RRC configuration of the waveform type for the first format of the PUCCH. In some examples, the indication is a dynamic indication. In this example, the communication and processing circuitry 1542 may be configured to provide (e.g., via the communication interface 1510) a PUCCH resource configuration indicating a respective waveform configuration for each of a plurality of PUCCH resources. In addition, the communication and processing circuitry 1542 may be configured to provide (e.g., via the communication interface) a PUCCH resource indicator (PRI) within downlink control information (DCI). The PRI may indicate a PUCCH resource of the plurality of PUCCH resources for the PUCCH. The PRI may further indicate the waveform type for the first format of the PUCCH based on the PUCCH resource.

In some examples, the indication is a semi-persistent command for waveform switching from a first waveform type to a second waveform type for the PUCCH. In some examples, the first waveform type is associated with a second format having a same length range as the first format. In some examples, the communication and processing circuitry 1542 may be configured to provide (e.g., via the communication interface 1510) the semi-persistent command for waveform switching via one of DCI or a MAC-CE.

In some examples, the communication and processing circuitry 1542 may further be configured to receive (e.g., via the communication interface 1510) a capability of the UE (e.g., UE capability 1516) for waveform switching. The communication and processing circuitry 1542 may further be configured to store the capability 1516, for example, within the memory 1505. The UE capability 1516 may be based on at least one of a frequency range, a frequency band, a band combination, or a bandwidth part (BWP) of the PUCCH.

The communication and processing circuitry 1542 may further be configured to communicate (e.g., receive) the PUCCH using the waveform type for the first format. The PUCCH may be received, for example, from a UE. In some examples, the communication and processing circuitry 1542 may be configured to receive (e.g., via the communication interface 1510) the PUCCH including acknowledgement information for a scheduled physical downlink shared channel (PDSCH). In some examples, the communication and processing circuitry 1542 may be configured to receive (e.g., via the communication interface 1510) the PUCCH including acknowledgement information for a semi-persistently scheduled (SPS) PDSCH based on an activating DCI activating an SPS configuration for the SPS PDSCH. The communication and processing circuitry 1542 may further be configured to execute communication and processing instructions (software) 1552 stored on the computer-readable medium 1506 to implement one or more functions described herein.

The processor 1504 may further include PUCCH waveform identification circuitry 1544 configured to identify the waveform type from at least two waveform types. In some examples, the PUCCH waveform identification circuitry 1544 may further be configured to identify a number of symbols of the PUCCH for the waveform type. In this example, the PUCCH waveform identification circuitry 1544 together with the communication and processing circuitry 1542 may be configured to provide a PUCCH resource configuration indicating a respective waveform configuration for each of a plurality of PUCCH resources. The respective waveform configuration for each of the plurality of PUCCH resources indicates one of the at least two waveform types and a respective number of symbols associated with the respective waveform configuration. The PUCCH waveform identification circuitry 1544 together with the communication and processing circuitry 1542 may further be configured to provide a PUCCH resource indicator (PRI) within downlink control information (DCI). The PRI indicating a PUCCH resource of the plurality of PUCCH resources for the PUCCH and further indicating the waveform type for the first format of the PUCCH and the number of symbols of the PUCCH based on the PUCCH resource. In some examples, the PUCCH waveform identification circuitry 1544 may be configured to identify the number of symbols of the PUCCH for the waveform type based on the first format of the PUCCH.

The PUCCH waveform identification circuitry 1544 may further be configured to switch from a first waveform type having a first number of symbols to a second waveform type having a second number of symbols different than the first number of symbols for the first format of the PUCCH. In some examples, the second number of symbols is greater than the first number of symbols and wherein a first overhead of demodulation reference signals (DMRSs) for the first number of symbols is greater than a second overhead of DMRSs for the second number of symbols.

In some examples, the PUCCH waveform identification circuitry 1544 may further be configured to identify the waveform type for the first format of the PUCCH based on the UE capability 1516. The PUCCH waveform identification circuitry 1544 may further be configured to execute PUCCH waveform identification instructions (software) 1554 stored on the computer-readable medium 1506 to implement one or more functions described herein.

Figure 16:
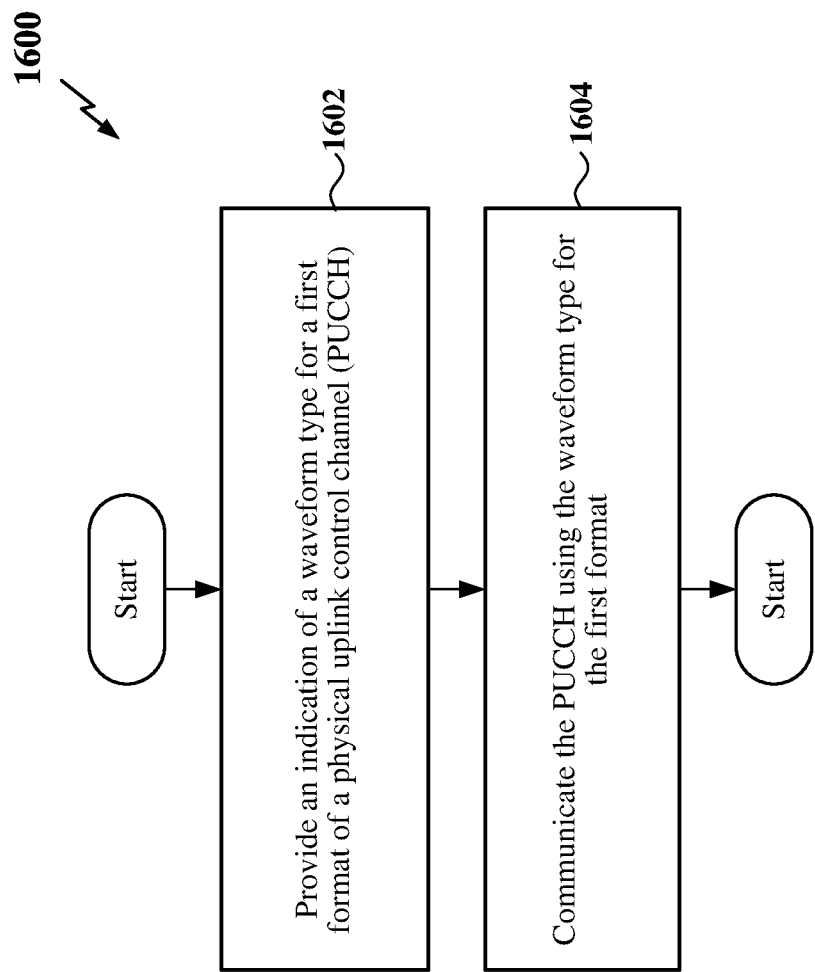
FIG. 16 is a flow chart of an exemplary process for PUCCH waveform indication according to some aspects.

FIG. 16 is a flow chart illustrating an exemplary process 1600 for waveform indication according to some aspects. As described below, some or all illustrated features may be omitted in a particular implementation within the scope of the present disclosure, and some illustrated features may not be required for implementation of all embodiments. In some examples, the process 1600 may be carried out by the network entity 1500 illustrated in FIG. 15. In some examples, the process 1600 may be carried out by any suitable apparatus or means for carrying out the functions or algorithm described below.

At block 1602, the network entity may provide an indication of a waveform type for a first format of a physical uplink control channel (PUCCH). In some examples, the waveform type includes cyclic prefix-orthogonal frequency division multiplexing (CP-OFDM) or discrete Fourier transform-spread-OFDM (DFT-s-OFDM). In some examples, the first format includes PUCCH format 2. In some examples, the first format includes PUCCH format 2 or a different short PUCCH format with more than two bits. In this example, the waveform type associated with the PUCCH format 2 includes CP-OFDM and the waveform type associated with the different short PUCCH format includes DFT-s-OFDM. In some examples, the indication indicates at least one parameter associated with the waveform type.

In some examples, the indication is a semi-static indication. In this example, the network entity may provide a radio resource control (RRC) configuration of the waveform type for the first format of the PUCCH. In some examples, the indication includes a dynamic indication. In this example, the network entity may provide a PUCCH resource configuration indicating a respective waveform configuration for each of a plurality of PUCCH resources. In addition, the network entity may provide a PUCCH resource indicator (PRI) within downlink control information (DCI). The PRI indicates a PUCCH resource of the plurality of PUCCH resources for the PUCCH. The PRI further indicates the waveform type for the first format of the PUCCH based on the PUCCH resource.

In some examples, the network entity may identify the waveform type from at least two waveform types. In addition, the network entity may identify a number of symbols for the PUCCH for the waveform type. In some examples, the network entity may identify the number of symbols of the PUCCH for the waveform type based on the first format of the PUCCH. In some examples, the network entity may provide a PUCCH resource configuration indicating a respective waveform configuration for each of a plurality of PUCCH resources. The respective waveform configuration for each of the plurality of PUCCH resources indicates one of the at least two waveform types and a respective number of symbols associated with the respective waveform configuration. In some examples, the network entity may provide a PUCCH resource indicator (PRI) within downlink control information (DCI). The PRI indicates a PUCCH resource of the plurality of PUCCH resources for the PUCCH. The PRI further indicates the waveform type for the first format of the PUCCH and the number of symbols of the PUCCH based on the PUCCH resource. In some examples, the network entity may switch from a first waveform type having a first number of symbols to a second waveform type having a second number of symbols different than the first number of symbols for the first format of the PUCCH. In some examples, the second number of symbols is greater than the first number of symbols, and a first overhead of demodulation reference signals (DMRSs) for the first number of symbols is greater than a second overhead of DMRSs for the second number of symbols.

In some examples, the network entity may provide a semi-persistent command for waveform switching from a first waveform type to a second waveform type for the PUCCH. In some examples, the first waveform type is associated with a second format of the PUCCH having a same length range as the first format. In some examples, the network entity may provide the semi-persistent command for waveform switching via one of downlink control information (DCI) or a medium access control (MAC) control element (MAC-CE). In some examples, the network entity may provide the indication of the waveform type for the first format of the PUCCH to a UE based on a capability of the UE. In some examples, the capability of the UE is based on at least one of a frequency range, a frequency band, a band combination, or a bandwidth part (BWP) of the PUCCH. For example, the communication and processing circuitry 1542 together with the PUCCH waveform identification circuitry 1544 and communication interface 1510 shown and described above in connection with FIG. 15 may provide a means to provide the indication of the waveform type for the first format of the PUCCH.

At block 1604, the network entity may communicate the PUCCH using the waveform type for the first format. In some examples, the PUCCH includes acknowledgement information for a scheduled physical downlink shared channel (PDSCH). In other examples, the PUCCH includes acknowledgement information for a semi-persistently scheduled (SPS) PDSCH based on an activating DCI activating an SPS configuration for the SPS PDSCH. For example, the communication and processing circuitry 1542 and communication interface 1510, shown and described above in connection with FIG. 15 may provide a means to communicate the PUCCH using the waveform type for the first format.

In one configuration, the network entity includes means for providing an indication of a waveform type for a first format of a physical uplink control channel (PUCCH) and means for communicating the PUCCH using the waveform type for the first format. In one aspect, the aforementioned means may be the processor 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable storage medium 1506, or any other suitable apparatus or means described in any one of FIGS. 1-3, 6, and 15, and utilizing, for example, the processes and/or algorithms described herein in relation to FIGS. 9, 10, 12 and 16.

The following provides an overview of aspects of the present disclosure:

Aspect 1: A method for wireless communication at a network entity, the method comprising: providing an indication of a waveform type for a first format of a physical uplink control channel (PUCCH); and communicating the PUCCH using the waveform type for the first format.

Aspect 2: The method of aspect 1, wherein the waveform type comprises cyclic prefix-orthogonal frequency division multiplexing (CP-OFDM) or discrete Fourier transform-spread-OFDM (DFT-s-OFDM).

Aspect 3: The method of aspect 1 or 2, wherein the first format comprises PUCCH format 2.

Aspect 4: The method of aspect 1 or 2, wherein the first format comprises PUCCH format 2 or a different short PUCCH format with more than two bits, and wherein the waveform type associated with the PUCCH format 2 comprises CP-OFDM and the waveform type associated with the different short PUCCH format comprises DFT-s-OFDM.

Aspect 5: The method of any of aspects 1 through 4, wherein the indication indicates at least one parameter associated with the waveform type.

Aspect 6: The method of any of aspects 1 through 5, wherein the indication comprises a semi-static indication, and wherein the providing the indication of the waveform type further comprises: providing a radio resource control (RRC) configuration of the waveform type for the first format of the PUCCH.

Aspect 7: The method of any of aspects 1 through 5, wherein the indication comprises a dynamic indication, and wherein the providing the indication of the waveform type for the first format of the PUCCH further comprises: providing a PUCCH resource configuration indicating a respective waveform configuration for each of a plurality of PUCCH resources.

Aspect 8: The method of aspect 7, wherein the providing the indication of the waveform type for the first format of the PUCCH further comprises: providing a PUCCH resource indicator (PRI) within downlink control information (DCI), the PRI indicating a PUCCH resource of the plurality of PUCCH resources for the PUCCH, the PRI further indicating the waveform type for the first format of the PUCCH based on the PUCCH resource.

Aspect 9: The method of aspect 8, wherein the communicating the PUCCH using the waveform type for the first format further comprises: receiving the PUCCH comprising acknowledgement information for a scheduled physical downlink shared channel (PDSCH).

Aspect 10: The method of aspect 8, wherein the communicating the PUCCH using the waveform type for the first format further comprises: receiving the PUCCH comprising acknowledgement information for a semi-persistently scheduled (SPS) PDSCH based on an activating DCI activating an SPS configuration for the SPS PDSCH.

Aspect 11: The method of any of aspects 1 through 5 or 7 through 10, further comprising: identifying the waveform type from at least two waveform types; and identifying a number of symbols of the PUCCH for the waveform type.

Aspect 12: The method of aspect 11, wherein the providing the indication of the waveform type for the first format of the PUCCH further comprises: providing a PUCCH resource configuration indicating a respective waveform configuration for each of a plurality of PUCCH resources, the respective waveform configuration for each of the plurality of PUCCH resources indicating one of the at least two waveform types and a respective number of symbols associated with the respective waveform configuration; and providing a PUCCH resource indicator (PRI) within downlink control information (DCI), the PRI indicating a PUCCH resource of the plurality of PUCCH resources for the PUCCH, the PRI indicating the waveform type for the first format of the PUCCH and the number of symbols of the PUCCH based on the PUCCH resource.

Aspect 13: The method of aspect 11 or 12, wherein the identifying the number of symbols of the PUCCH for the waveform type further comprises: identifying the number of symbols of the PUCCH for the waveform type based on the first format of the PUCCH.

Aspect 14: The method of any of aspects 11 through 13, wherein the identifying the waveform type further comprises: switching from a first waveform type having a first number of symbols to a second waveform type having a second number of symbols different than the first number of symbols for the first format of the PUCCH.

Aspect 15: The method of aspect 14, wherein the second number of symbols is greater than the first number of symbols and wherein a first overhead of demodulation reference signals (DMRSs) for the first number of symbols is greater than a second overhead of DMRSs for the second number of symbols.

Aspect 16: The method of any of aspects 1 through 5, wherein the providing the indication of the waveform type for the first format of the PUCCH further comprises: providing a semi-persistent command for waveform switching from a first waveform type to a second waveform type for the PUCCH.

Aspect 17: The method of aspect 16, wherein the first waveform type is associated with a second format of the PUCCH having a same length range as the first format.

Aspect 18: The method of aspect 16 or 17, wherein the providing the semi-persistent command for waveform switching further comprises: providing the semi-persistent command for waveform switching via one of downlink control information (DCI) or a medium access control (MAC) control element (MAC-CE).

Aspect 19: The method of any of aspects 1 through 18, wherein the providing the indication of the waveform type for the first format of the PUCCH further comprises: providing the indication of the waveform type for the first format of the PUCCH to a user equipment (UE) based on a capability of the UE.

Aspect 20: The method of aspect 19, wherein the capability of the UE is based on at least one of a frequency range, a frequency band, a band combination, or a bandwidth part (BWP) of the PUCCH.

Aspect 21: A network entity comprising a memory and a processor coupled to the memory, the processor being configured to perform a method of any one of aspects 1 through 20.

Aspect 22: A network entity comprising means for performing a method of any one of aspects 1 through 20.

Aspect 23: A non-transitory computer-readable medium having stored therein instructions executable by one or more processors of a network entity to perform a method of any one of aspects 1 through 20.

Aspect 24: A method for wireless communication at a user equipment, the method comprising: receiving an indication of a waveform type for a first format of a physical uplink control channel (PUCCH); and communicating the PUCCH using the waveform type for the first format.

Aspect 25: The method of aspect 24, wherein the waveform type comprises cyclic prefix-orthogonal frequency division multiplexing (CP-OFDM) or discrete Fourier transform-spread-OFDM (DFT-s-OFDM).

Aspect 26: The method of aspect 24 or 25, wherein the first format comprises PUCCH format 2.

Aspect 27: The method of aspect 24 or 25, wherein the first format comprises PUCCH format 2 or a different short PUCCH format with more than two bits, and wherein the waveform type associated with the PUCCH format 2 comprises CP-OFDM and the waveform type associated with the different short PUCCH format comprises DFT-s-OFDM.

Aspect 28: The method of any of aspects 24 through 27, wherein the indication indicates at least one parameter associated with the waveform type.

Aspect 29: The method of any of aspects 24 through 28, wherein the indication comprises a semi-static indication, and wherein the receiving the indication of the waveform type further comprises: receiving a radio resource control (RRC) configuration of the waveform type for the first format of the PUCCH.

Aspect 30: The method of any of aspects 24 through 28, wherein the indication comprises a dynamic indication, and wherein the receiving the indication of the waveform type for the first format of the PUCCH further comprises: receiving a PUCCH resource configuration indicating a respective waveform configuration for each of a plurality of PUCCH resources.

Aspect 31: The method of aspect 30, wherein the receiving the indication of the waveform type for the first format of the PUCCH further comprises: receiving a PUCCH resource indicator (PRI) within downlink control information (DCI), the PRI indicating a PUCCH resource of the plurality of PUCCH resources for the PUCCH, the PRI further indicating the waveform type for the first format of the PUCCH based on the PUCCH resource.

Aspect 32: The method of aspect 31, wherein the communicating the PUCCH using the waveform type for the first format further comprises: transmitting the PUCCH comprising acknowledgement information for a scheduled physical downlink shared channel (PDSCH).

Aspect 33: The method of aspect 31, wherein the communicating the PUCCH using the waveform type for the first format further comprises: transmitting the PUCCH comprising acknowledgement information for a semi-persistently scheduled (SPS) PDSCH based on an activating DCI activating an SPS configuration for the SPS PDSCH.

Aspect 34: The method of any of aspects 24 through 28 or 30 through 33, wherein the receiving the indication of the waveform type for the first format of the PUCCH further comprises: receiving a PUCCH resource configuration indicating a respective waveform configuration for each of a plurality of PUCCH resources, the respective waveform configuration for each of the plurality of PUCCH resources indicating one of at least two waveform types and a respective number of symbols associated with the respective waveform configuration; and receiving a PUCCH resource indicator (PRI) within downlink control information (DCI), the PRI indicating a PUCCH resource of the plurality of PUCCH resources for the PUCCH, the PRI indicating the waveform type for the first format of the PUCCH and a number of symbols of the PUCCH based on the PUCCH resource.

Aspect 35: The method of aspect 34, further comprising: switching from a first waveform type having a first number of symbols to a second waveform type having a second number of symbols different than the first number of symbols for the first format of the PUCCH.

Aspect 36: The method of aspect 35, wherein the second number of symbols is greater than the first number of symbols and wherein a first overhead of demodulation reference signals (DMRSs) for the first number of symbols is greater than a second overhead of DMRSs for the second number of symbols.

Aspect 37: The method of any of aspects 24 through 28, wherein the receiving the indication of the waveform type for the first format of the PUCCH further comprises: receiving a semi-persistent command for waveform switching from a first waveform type to a second waveform type for the PUCCH.

Aspect 39: The method of aspect 37, wherein the first waveform type is associated with a second format of the PUCCH having a same length range as the first format.

Aspect 40: The method of aspect 37 or 38, wherein the receiving the semi-persistent command for waveform switching further comprises: receiving the semi-persistent command for waveform switching via one of downlink control information (DCI) or a medium access control (MAC) control element (MAC-CE).

Aspect 41: The method of any of aspects 24 through 40, wherein the receiving the indication of the waveform type for the first format of the PUCCH further comprises: receiving the indication of the waveform type for the first format of the PUCCH based on a capability of the user equipment.

Aspect 42: The method of aspect 41, wherein the capability of the user equipment is based on at least one of a frequency range, a frequency band, a band combination, or a bandwidth part (BWP) of the PUCCH.

Aspect 43: A user equipment comprising a memory and a processor coupled to the memory, the processor being configured to perform a method of any one of aspects 24 through 42.

Aspect 44: A user equipment comprising means for performing a method of any one of aspects 24 through 42.

Aspect 45: A non-transitory computer-readable medium having stored therein instructions executable by one or more processors of a network entity to perform a method of any one of aspects 24 through 42.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-3, 6, 9, 10, 12, 13, and/or 15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A network entity configured for wireless communication, comprising:
   one or more memories; and
   one or more processors coupled to the one or more memories, the one or more processors being configured to:
   provide an indication of a waveform type for a first format of a physical uplink control channel (PUCCH) to a user equipment (UE) based on a capability of the UE; and
   communicate the PUCCH using the waveform type for the first format.

2. The network entity of claim 1, wherein the waveform type comprises cyclic prefix-orthogonal frequency division multiplexing (CP-OFDM) or discrete Fourier transform-spread-OFDM (DFT-s-OFDM).

3. The network entity of claim 1, wherein the first format comprises PUCCH format 2.

4. The network entity of claim 1, wherein the first format comprises PUCCH format 2 or a different short PUCCH format with more than two bits, and wherein the waveform type associated with the PUCCH format 2 comprises CP-OFDM and the waveform type associated with the different short PUCCH format comprises DFT-s-OFDM.

5. The network entity of claim 1, wherein the indication indicates at least one parameter associated with the waveform type.

6. The network entity of claim 1, wherein the indication comprises a semi-static indication and wherein the one or more processors are further configured to:
   provide a radio resource control (RRC) configuration of the waveform type for the first format of the PUCCH.

7. The network entity of claim 1, wherein the indication comprises a dynamic indication and wherein the one or more processors are configured to:
   provide a PUCCH resource configuration indicating a respective waveform configuration for each of a plurality of PUCCH resources.

8. The network entity of claim 7, wherein the one or more processors are further configured to:
   provide a PUCCH resource indicator (PRI) within downlink control information (DCI), the PRI indicating a PUCCH resource of the plurality of PUCCH resources for the PUCCH, the PRI further indicating the waveform type for the first format of the PUCCH based on the PUCCH resource.

9. The network entity of claim 8, wherein the one or more processors are further configured to:
receive the PUCCH comprising acknowledgement information for a scheduled physical downlink shared channel (PDSCH).

10. The network entity of claim 8, wherein the one or more processors are further configured to:
receive the PUCCH comprising acknowledgement information for a semi-persistently scheduled (SPS) PDSCH based on an activating DCI activating an SPS configuration for the SPS PDSCH.

11. The network entity of claim 1, wherein the one or more processors are further configured to:
identify the waveform type from at least two waveform types; and
identify a number of symbols of the PUCCH for the waveform type.

12. The network entity of claim 11, wherein the one or more processors are further configured to:
provide a PUCCH resource configuration indicating a respective waveform configuration for each of a plurality of PUCCH resources, the respective waveform configuration for each of the plurality of PUCCH resources indicating one of the at least two waveform types and a respective number of symbols associated with the respective waveform configuration; and
provide a PUCCH resource indicator (PRI) within downlink control information (DCI), the PRI indicating a PUCCH resource of the plurality of PUCCH resources for the PUCCH, the PRI indicating the waveform type for the first format of the PUCCH and the respective number of symbols of the PUCCH based on the PUCCH resource.

13. The network entity of claim 11, wherein the one or more processors are further configured to:
identify the number of symbols of the PUCCH for the waveform type based on the first format of the PUCCH.

14. The network entity of claim 11, wherein the one or more processors are further configured to:
switch from a first waveform type having a first number of symbols to a second waveform type having a second number of symbols different than the first number of symbols for the first format of the PUCCH.

15. The network entity of claim 14, wherein the second number of symbols is greater than the first number of symbols and wherein a first overhead of demodulation reference signals (DMRSs) for the first number of symbols is greater than a second overhead of DMRSs for the second number of symbols.

16. The network entity of claim 1, wherein the one or more processors are further configured to:
provide a semi-persistent command for waveform switching from a first waveform type to a second waveform type for the PUCCH.

17. The network entity of claim 16, wherein the first waveform type is associated with a second format of the PUCCH having a same length range as the first format.

18. The network entity of claim 16, wherein the one or more processors are further configured to:
provide the semi-persistent command for waveform switching via one of downlink control information (DCI) or a medium access control (MAC) control element (MAC-CE).

19. The network entity of claim 1, wherein the capability of the UE is based on at least one of a frequency range, a frequency band, a band combination, or a bandwidth part (BWP) of the PUCCH.

20. A method for wireless communication at a network entity, the method comprising:
providing an indication of a waveform type for a first format of a physical uplink control channel (PUCCH) to a user equipment (UE) based on a capability of the UE; and
communicating the PUCCH using the waveform type for the first format.

21. The method of claim 20, wherein the indication comprises a semi-static indication, and wherein the providing the indication of the waveform type further comprises:
providing a radio resource control (RRC) configuration of the waveform type for the first format of the PUCCH.

22. The method of claim 20, wherein the indication comprises a dynamic indication, and wherein the providing the indication of the waveform type for the first format of the PUCCH further comprises:
providing a PUCCH resource configuration indicating a respective waveform configuration for each of a plurality of PUCCH resources; and
providing a PUCCH resource indicator (PRI) within downlink control information (DCI), the PRI indicating a PUCCH resource of the plurality of PUCCH resources for the PUCCH, the PRI further indicating the waveform type for the first format of the PUCCH based on the PUCCH resource.

23. The method of claim 20, wherein the providing the indication of the waveform type for the first format of the PUCCH further comprises:
providing a semi-persistent command for waveform switching from a first waveform type to a second waveform type for the PUCCH.

24. A user equipment configured for wireless communication, comprising:
one or more transceivers configured to communicate with a network entity;
one or more memories; and
one or more processors coupled to the one or more transceivers and the one or more memories, the one or more processors being configured to:
receive an indication of a waveform type for a first format of a physical uplink control channel (PUCCH) based on a capability of the UE; and
communicate the PUCCH using the waveform type for the first format.

25. The user equipment of claim 24, wherein the indication comprises a semi-static indication, and wherein the one or more processors are further configured to:
receive a radio resource control (RRC) configuration of the waveform type for the first format of the PUCCH.

26. The user equipment of claim 24, wherein the indication comprises a dynamic indication, and wherein the one or more processors are configured to:
receive a PUCCH resource configuration indicating a respective waveform configuration for each of a plurality of PUCCH resources; and
receive a PUCCH resource indicator (PRI) within downlink control information (DCI), the PRI indicating a PUCCH resource of the plurality of PUCCH resources for the PUCCH, the PRI further indicating the waveform type for the first format of the PUCCH based on the PUCCH resource.

27. The user equipment of claim 24, wherein the one or more processors are further configured to:
provide a semi-persistent command for waveform switching from a first waveform type to a second waveform type for the PUCCH.

28. A method for wireless communication at a user equipment, the method comprising:
- receiving an indication of a waveform type for a first format of a physical uplink control channel (PUCCH) based on a capability of the UE; and
- communicating the PUCCH using the waveform type for the first format.

29. The method of claim 28, wherein the indication comprises a semi-static indication, a dynamic indication, or a semi-persistent command for waveform switching.

* * * * *